United States Patent [19]

Go

[11] Patent Number: 5,052,249

[45] Date of Patent: Oct. 1, 1991

[54] BOLT WRENCH

[75] Inventor: Seitaro Go, Tsuruga, Japan

[73] Assignee: Gotech, Limited, Fukui, Japan

[21] Appl. No.: 501,107

[22] Filed: Mar. 30, 1990

[51] Int. Cl.$^5$ .............................................. B25B 23/00
[52] U.S. Cl. ............................................. 81/55; 81/458
[58] Field of Search ...................... 81/54, 55, 57.4, 125, 81/453, 458

[56] References Cited

U.S. PATENT DOCUMENTS 4,630,510 12/1986 Belanger ................................. 81/55
4,836,063 6/1989 Fushiya .................................. 81/55

FOREIGN PATENT DOCUMENTS 1059367 6/1959 Fed. Rep. of Germany ........ 81/458

Primary Examiner—James G. Smith
Attorney, Agent, or Firm—Jones, Tullar & Cooper

[57] ABSTRACT

An elongated wrench for fastener bolts, such as commonly used with nuclear fuel assemblies for a boiling water type nuclear reactor. The bolt wrench includes a socket wrench mounted to a control rod, an outer cover for supporting the control rod for axial as well as rotational movement therein, a plurality of releasable hooks pivotally mounted to the control rod around the socket wrench, and a control lever for moving the outer cover relative to the control rod to cause the releasable hooks to grip a fastener bolt. In a second embodiment, a pair of releasable hooks having guide rollers are pivotally mounted to a support sleeve which, in turn, is mounted on the outer cover for axial movement relative thereto. An actuator link having a pair of guide grooves adapted to receive the associated rollers is movable along the support sleeve in response to axial movement of the outer cover relative to the control rod. The guide grooves are configured to cause the releasable hooks to grip the bolt upon axial movement of the actuator link as caused by the axial movement of the outer cover.

26 Claims, 12 Drawing Sheets

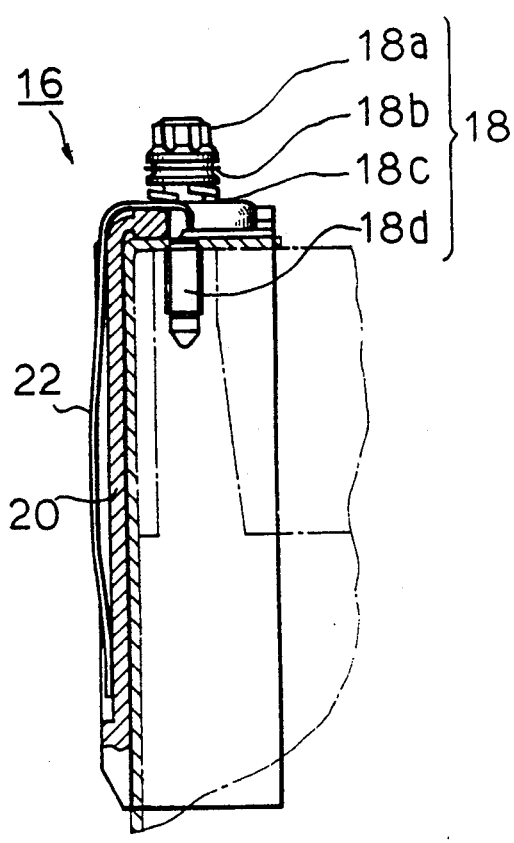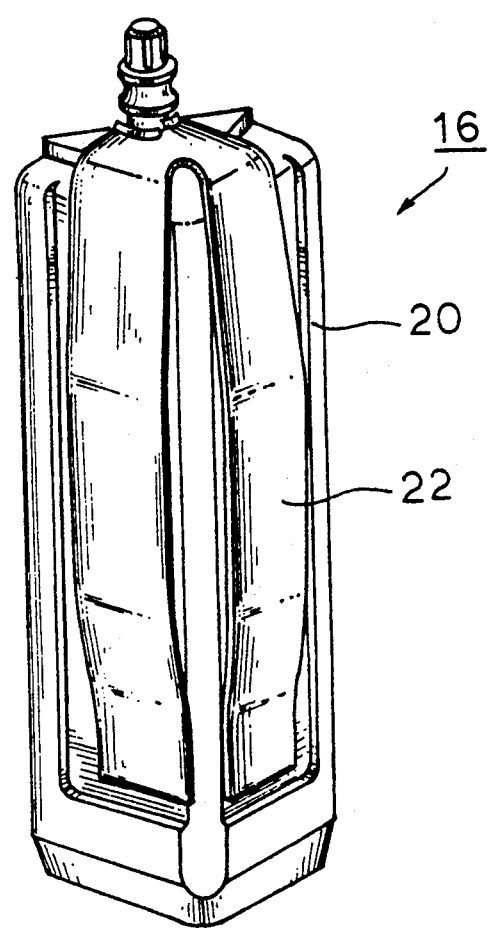
FIG. 2(a)
FIG. 2(b)

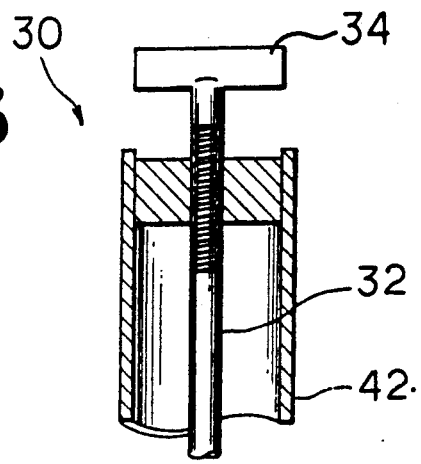
FIG. 3
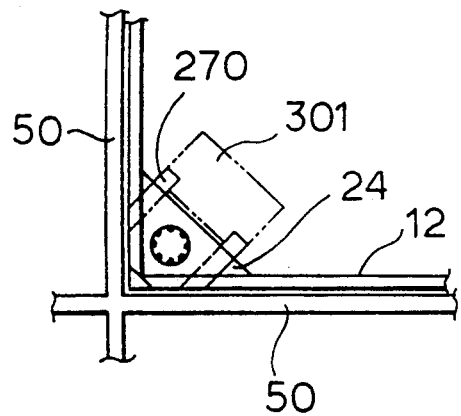
FIG. 4
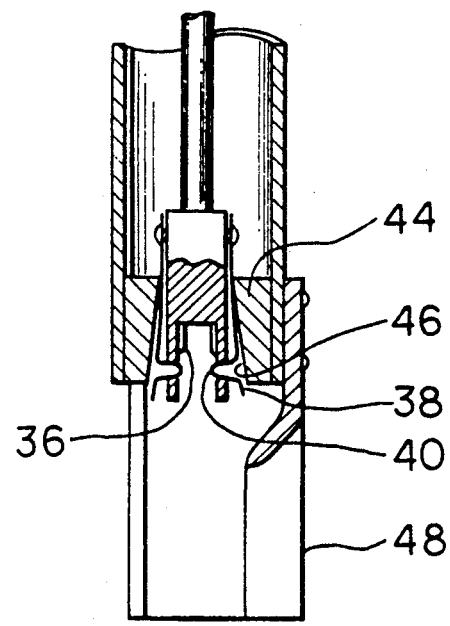
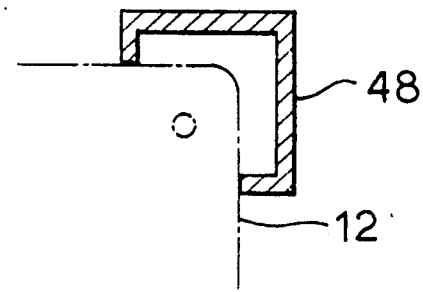

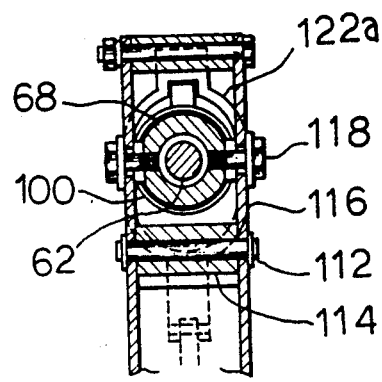
FIG. 6
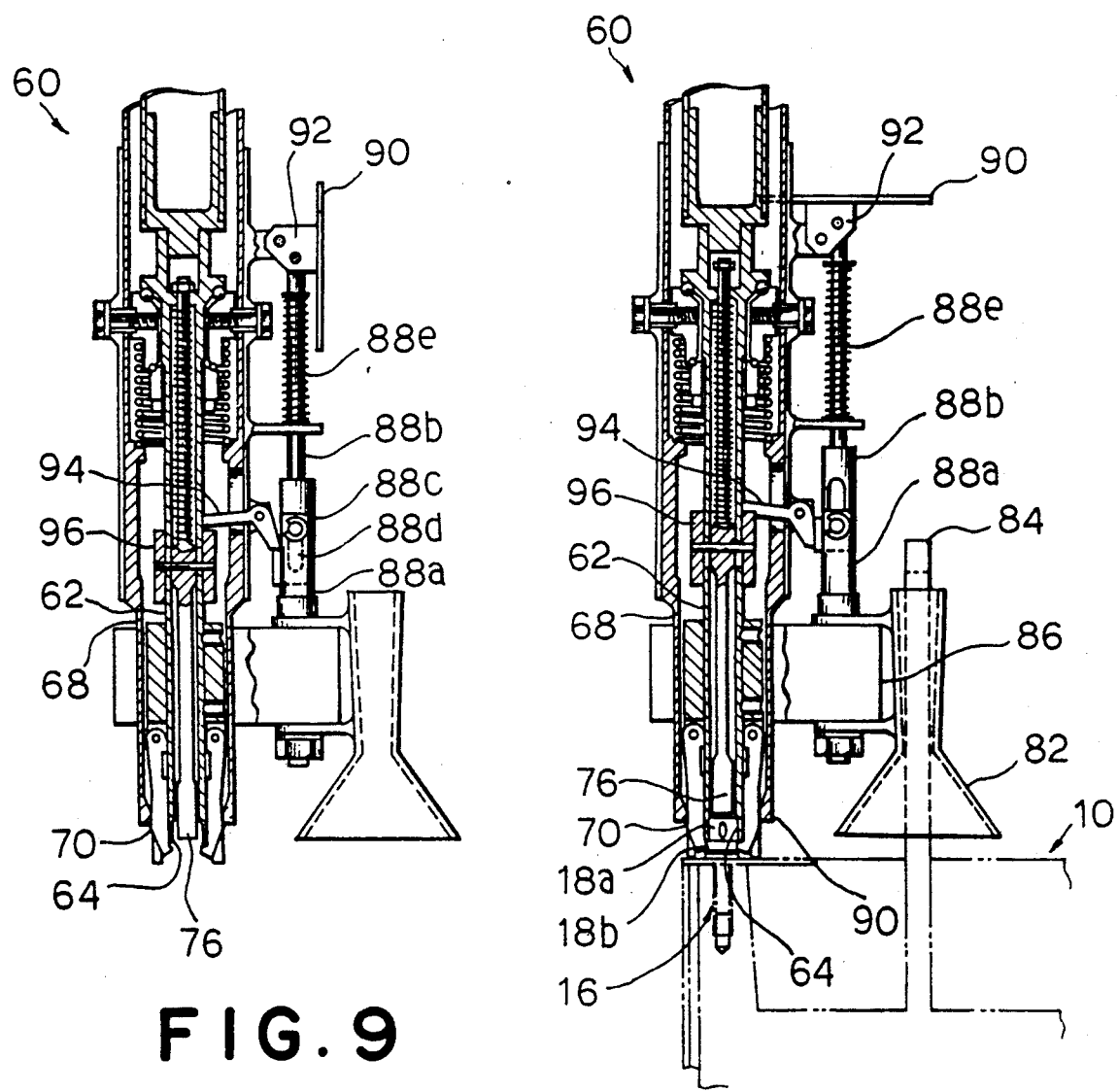
FIG. 9
FIG. 8

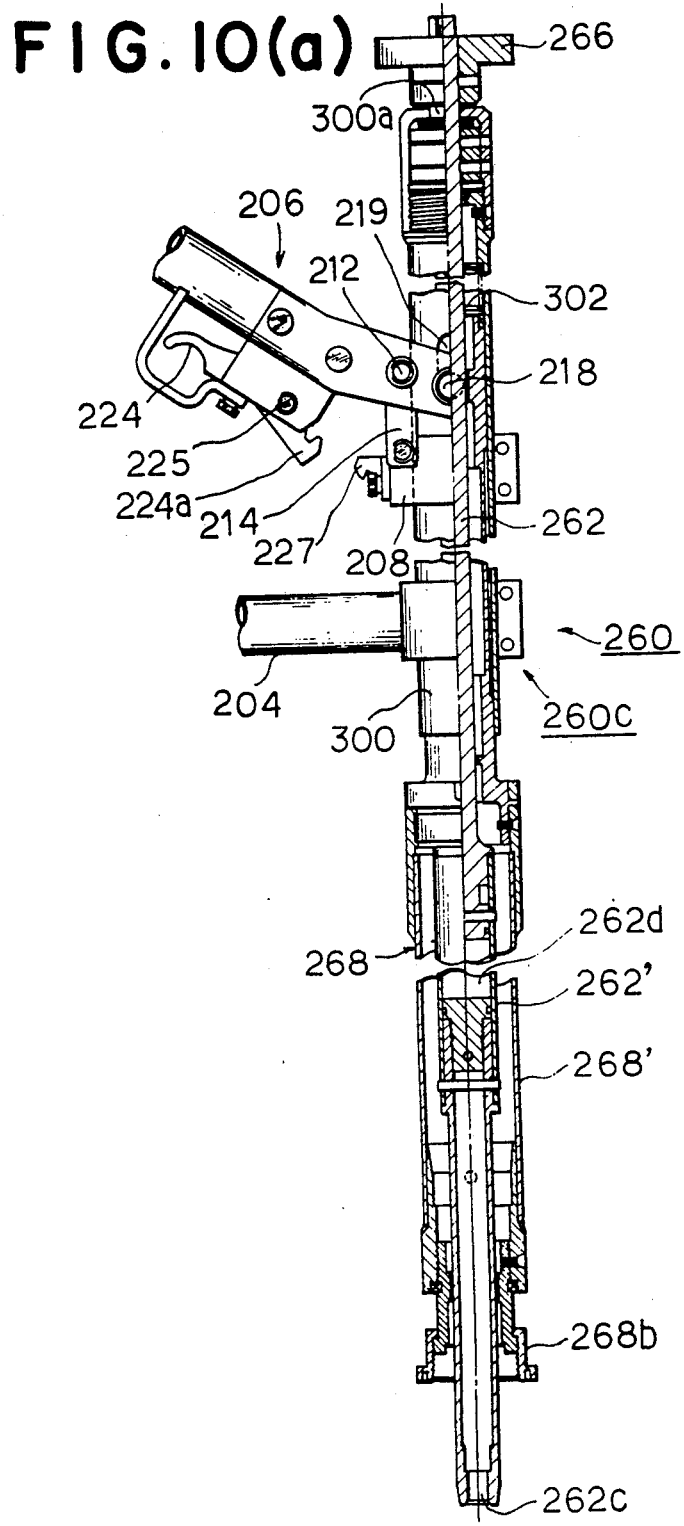
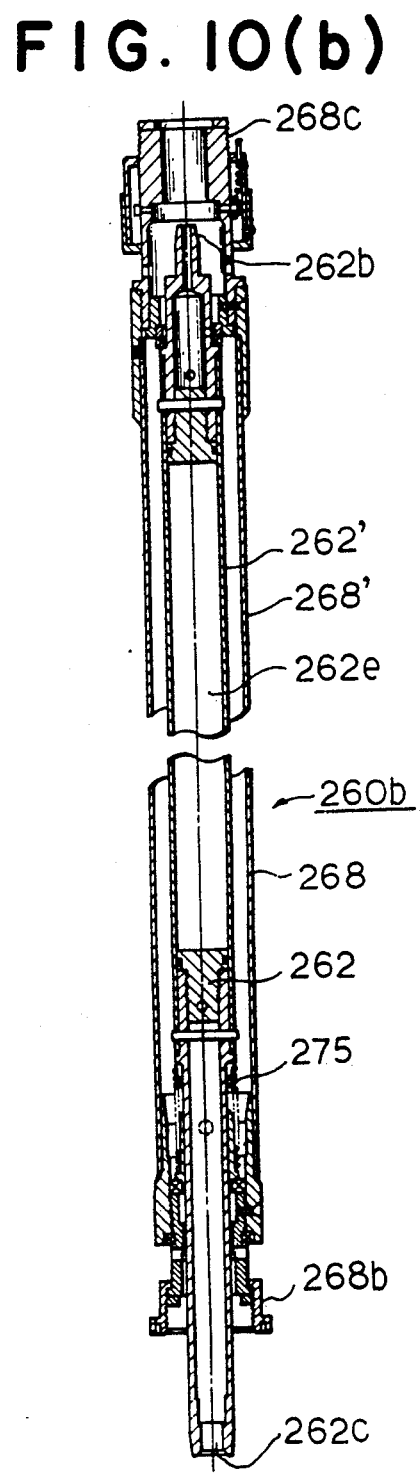
FIG. 10(a)
FIG. 10(b)

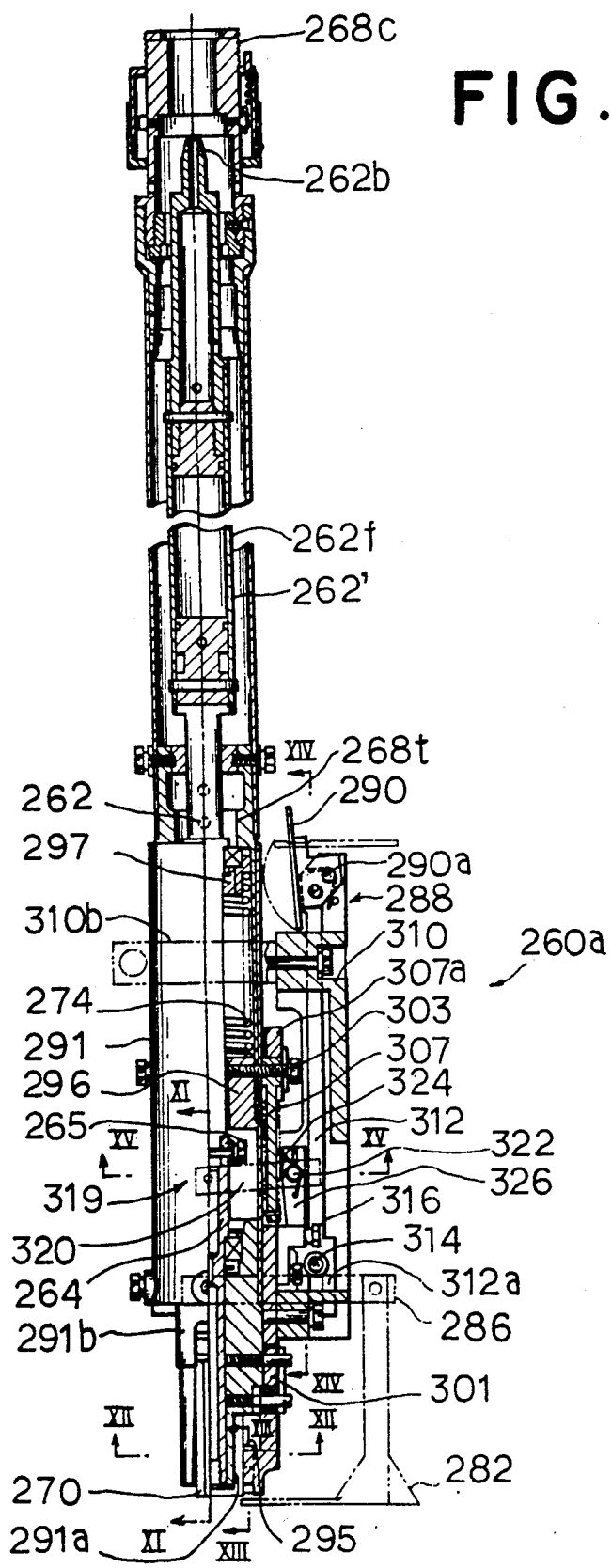
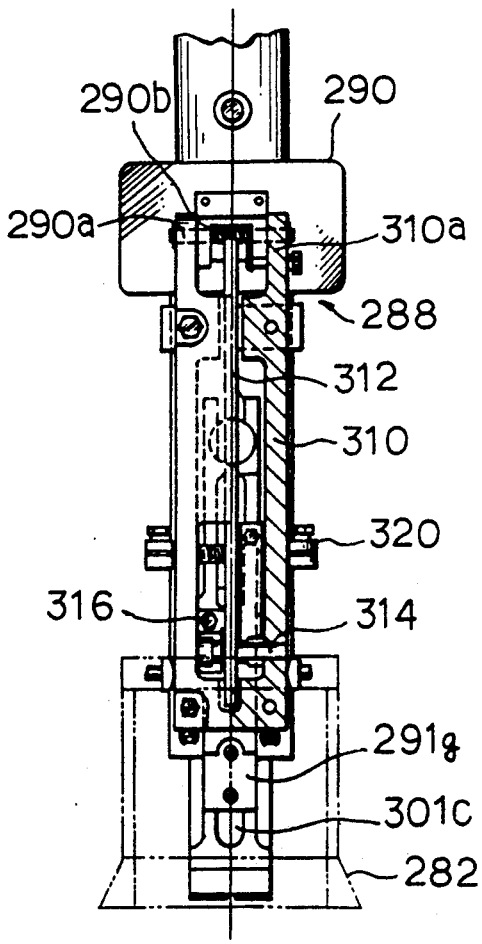

BOLT WRENCH

BACKGROUND OF THE INVENTION

1. Field of the Invention

This invention relates generally to nuclear fuel handling apparatus and, more particularly, to a remotely controlled hand tool which is adapted for use during refuelling or inspections in order to mount and/or remove fastener bolts used to secure a channel box to a nuclear fuel assembly. This invention is particularly useful for nuclear fuel assemblies for a boiling water type nuclear reactor.

2. Background

Conventional designs of fuel assemblies for use in a boiling water type nuclear reactor include a multiplicity of fuel rods held in an organized array by spacers spaced along the fuel assembly length. As illustrated in FIG. 1 of the accompanying drawings, such a fuel assembly 10 includes a tubular channel box 12 which is generally square in cross section having a fuel assembly proper 14 mounted therein in a telescopic relationship to each other. The channel box 12 serves to promote contact of the fuel rods with primary coolant flow, facilitate guidance of the fuel rods in the reactor and protect the fuel assembly against accidental damage during transfer to and from a spent fuel storage pool. The channel box 12 is fastened to the fuel assembly by means of a single fastener bolt 16.

A plurality, e.g., about 760 such fuel assemblies are used in a light water reactor of a million KW class, and usually about one fourth of the 760 assemblies, i.e., about 200 assemblies are replaced once a year during a refuelling operation.

During refuelling or periodically performed inspections, such fuel assemblies 10 are transferred from the reactor to a spent fuel storage pool where the fastener bolt 16 is removed using a special tool, commonly called a "bolt wrench", for subsequent separation of the channel box 12 from the associated fuel assembly. The channel box and the fuel assembly proper are then processed separately. This handling of the spent fuel assemblies is usually carried out underwater within the spent fuel storage pool for purposes of reducing operator's exposure to radioactivities and of cooling the fuel assemblies.

FIGS. 2(a) and 2(b) are a partially sectioned front elevation and a perspective view, respectively, of a typical fastener bolt 16 comprising a bolt proper 18, an angle guard 20 and a bifurcated spring washer 22. The bolt proper 18 has a spline head 18a, a circumferential groove 18b, a neck 18c and a threaded portion 18d. The angle guard 20 includes a flat top and an angle portion integrally formed therewith. The angle guard 20 and the bifurcated spring washer 22 are loosely fitted around the bolt neck 18c so that they may not fall off from the fastener bolt. As shown in FIG. 1, the fastener bolt 16 is placed on a clip 24 provided at a top corner of the channel box 12, with the angle portion of the guard 20 and the bifurcated washer 22 disposed on the outer surfaces of the channel box, and also with the threaded portion 18d extending through an opening in the clip 24. To secure the channel box 12 to the fuel assembly, the fastener bolt 16 is rotated in a direction to move the thread portion 18d into a threaded bore formed in the top of the fuel assembly.

FIG. 3 illustrates a typical tool in the form of a bolt wrench 30 of the conventional type used to remove the fastener bolt 16 from the spent fuel assembly 10. This bolt wrench 30 is about 4 meters long and includes a control rod 32 having a knob 34 provided at its upper end and a cylindrical socket wrench 36 mounted at its lower open end; a leaf spring 38 mounted around the socket wrench 36 and having an inwardly directed annular projection 40 near its lower end; a cylindrical cover 42 for the control rod 32, the cover supporting at its lower end a mouth piece 44 having a tapered bore 46; and a guide member 48. This bolt wrench 30 is usually employed in the manner to be described below:

(1) From a platform above the spent fuel storage pool, the bolt wrench 30 is lowered into the water by an operator on the platform until the lower end of the bolt wrench 30 rests on one of the underwater fuel assemblies 10. The bolt wrench 30 is further lowered with the guide member 48 in sliding engagement with the outer surfaces of the channel box 12, as shown in FIG. 3, until the socket wrench 36 on the lower end of the control rod 32 is received on the spline head 18a of the fastener bolt 16.

(2) Then, the knob 34 is rotated in a direction to loosen the bolt 18 from the threaded bore and simultaneously to move the socket wrench 36 and the control rod 32 upwardly relative to the cover 42 until the annular projection 40 of the leaf spring 38 moves radially inwardly into engagement with the circumferential groove 18b of the fastener bolt 18 because of the leaf spring 38 being in sliding engagement with the inner wall of the tapered bore 46. In this condition, it will be appreciated that the fastener bolt 18 is firmly held by the bolt wrench 30 so that it is ready for transfer to a predetermined location.

While the bolt wrench of this conventional type has proved generally satisfactory, it has several drawbacks as explained below:

Because of its structural limitations, the bolt wrench cannot be made longer than 5 meters, for example, so that in some installations where fuel assemblies are stored at a considerable distance from the operating platform, it is impossible to remove fastener bolts using this bolt wrench. To solve this problem, it has been a common practice to transfer fuel assemblies temporarily stored on a fuel rack which is positioned deep enough to have the upper ends of the fuel assemblies thereon about 7 meters below the water level to a preparation machine which is positioned lesser depth than the fuel rack, in order to perform the fastener bolt removing operation at the preparation machine. However, this necessitates frequent transfer of fuel assemblies within the spent fuel storage pool and thus increases the likelihood of accidental damage to the fuel assemblies during transfer. Further, more manpower will be needed in performing this operation and the level of operator's exposure to radioactivities will be increased.

Certainly it has been proposed to lengthen the control rod 32 of this bolt wrench 30 to such an extent that the socket wrench 36 on the lower end thereof can reach the fastener bolt to be removed. However, it should be noted that there is a need to reduce the weight of the control rod 32 and the cover 42 therefor to provide an overall light-weight yet sturdy structure which facilitates handling of the bolt wrench. Accordingly, further lengthening of the control rod 32 will result in unwanted bending of the rod during transportation or bolt removing, thus preventing its practical use.

There are additional problems associated with the above-described bolt wrench 30. For example, the annular projection 40 of the leaf spring 38 slidably engages the fastener bolt 16 for holding it firmly for subsequent transfer. Since the leaf spring 38 is formed of a relatively thin material, the annular projection 40 becomes excessively worn in a short period of time, necessitating frequent replacement of the leaf spring. Difficulties are also experienced by the operator in determining if the bolt wrench 30 is properly gripping the fastener bolt 16. If the fastener bolt is not properly gripped by the wrench, there is the likelihood that the bolt 16 will fall off during transfer.

FIG. 4 is a top plan view showing the manner in which the fuel assembly 10 is placed on the fuel rack in the spent fuel storage pool. In certain installations, the walls of the fuel rack have a height less than the channel box 12 of the fuel assembly 10, so that when placed on the fuel rack, the channel box projects above the walls 50. Accordingly, the operator does not usually have difficulties in bringing the bolt wrench of the prior art to an operative position on the fuel assembly. However, in most installations, the walls of the fuel racks are taller than the channel boxes 12 to be stored. In addition, the fuel assemblies are placed on such fuel racks with their channel boxes 12 in close contact with the inner walls of the fuel rack, so that the head 18a of the fastener bolt 16 threaded into the clip 24 is not adequately spaced from the two adjacent rack walls, as seen in FIG. 4. As a consequence of this inadequate spacing, the operator usually suffers from great difficulties in lowering the bolt wrench 30 into turning engagement with the head 18a of the fastener bolt 16, since the bolt gripping structure surrounding the socket wrench tends to come into abutting engagement with the upper edges of the fuel rack walls, preventing further lowering of the bolt wrench 30 into its operative position to grip the head 18a of the fastener bolt 16.

It is the primary object of the present invention to provide a new and improved apparatus for removing a fastener bolt used to secure a channel box to the fuel assembly with a view to overcoming the above-stated disadvantages of the prior art apparatus.

Another object is to provide an improved bolt wrench which enables an efficient and reliable bolt removing operation irrespective of the relative height of the channel box to the walls of the fuel rack on which the fuel assembly is placed.

A further object of the invention is to provide an improved bolt wrench which is capable of efficient bolt removal without the need to transfer fastener bolts from the fuel rack to a preparation machine.

A still further object is to provide an improved bolt wrench which can be divided into three shorter sections which are easy to handle for storage and transportation and which can easily be modified into a longer wrench by adding at least one intermediate section to the overall structure.

SUMMARY OF THE INVENTION

The objects stated above and other related objects in this invention are accomplished by the provision of a new and improved bolt wrench comprising, in combination: a control rod having a knob mounted to its first end and a socket wrench mounted to its second end, the socket wrench having a splined inner circumferential surface adapted to come into turning engagement with the head of a bolt to be removed when the bolt wrench is brought into an operative position relative to the bolt; an outer cover for supporting the control rod for axial as well as rotational movement therein; a plurality of releasable hooks pivotally mounted to the second end of the outer cover around the socket wrench with the tips of the releasable hooks extending beyond the socket wrench, the releasable hooks being movable between a first position in which the tips of the releasable hooks are in gripping engagement with the bolt and a second position in which the tips of the releasable hooks are released from the gripping engagement with the bolt; first control means for selectively moving the releasable hooks between the first and second positions; and second control means for selectively moving the outer cover axially relative to the control rod.

The control rod and the outer cover are comprised of a plurality of corresponding interconnectable sections, and each interconnectable section of the control rod includes a sealed cavity formed therein to create a buoyant force when in use in an underwater environment. Preferably, the bolt wrench includes guide means mounted to the outer cover to facilitate guidance of the bolt wrench into the operative position relative to the bolt, which guide means comprises a sleeve having a rectangular cross section with a flared end and adapted to receive a bail of a nuclear fuel assembly.

The first control means comprises first spring means operatively associated with the releasable hooks to urge their tips radially outwardly toward their second position, and an inner circumferential surface formed in the end of the outer cover adjacent to the releasable hooks, the inner circumferential surface of the outer cover being tapered radially inwardly toward the outer cover end, whereby axial movement of the outer cover away from the second end of the control rod causes the tapered inner circumferential surface to urge the releasable hooks radially inwardly into the first position.

Also, the second control means comprises a cylindrical support for supporting the outer cover for axial as well as rotational movement therein and for supporting the control rod for rotational movement therein, second spring means operatively associated with the outer cover and the control rod to urge the outer cover toward the second end of the control rod, a support ring mounted on the cylindrical support, and a control lever pivotally mounted to the support ring and operatively connected to the outer cover to axially move the outer cover relative to the control rod. Preferably, the second control means includes a lock means for locking the control lever in its positions corresponding to the first and second positions of the releasable hooks. The lock means comprises a trigger pivotally mounted to the control lever, a latch member pivotally connected to the trigger, a pair of notches formed in the support ring and adapted to be selectively engaged by the latch member, and third spring means provided between the control lever and the trigger to urge the latter so that the latch member is held in engagement with a selected one of the notches.

An indicator means is provided which provides a visual indication that the releasable hooks are properly gripping the bolt. The indicator means comprises a support sleeve mounted on the outer cover for axial movement with the control rod, an indicator plate mounted to the support sleeve for swinging movement between a horizontal and an upright position, rod means operatively connecting the indicator plate and the outer cover to move the former into the horizontal position when the releasable hooks move into the first position due to the axial movement of the outer cover away from the second end of the control rod, and fourth spring means for urging the indicator plate into the upright position.

The indicator means further includes an elongated mandrel mounted within the socket wrench for axial movement therein, the mandrel being adapted to be urged axially toward the first end of the control rod due to its abutment with the bolt when the socket wrench is in turning engagement with the bolt, and a lock lever pivotally mounted to the support sleeve, the lock lever being operatively associated with the mandrel and the rod means to prevent axial movement of the first rod means in a direction to swing the indicator plate into the horizontal position when the socket wrench is not in turning engagement with the bolt. The rod means comprises a first and a second telescopic actuator rod, one end of the first actuator rod being operatively connected to the indicator plate and the opposite end of the second actuator rod being operatively connected to the outer cover, the lock lever being adapted to engage the first actuator rod to prevent its axial movement when the socket wrench is not in turning engagement with the bolt, the first and the second actuator rods being adapted to move relative to each other when the lock lever engages the first actuator rod to prevent its axial movement.

In accordance with a second preferred embodiment of the present invention, there is provided a bolt wrench comprising, in combination: a control rod having a knob mounted to its first end and a socket wrench mounted to its second end, the socket wrench having a splined inner circumferential surface adapted to come into turning engagement with the head of a bolt to be removed when the bolt wrench is brought into an operative position relative to the bolt; an outer cover for supporting the control rod for axial as well as rotational movement therein; a support sleeve mounted on the outer cover for axial movement relative to each other, the support sleeve being disposed adjacent to the second end of the control rod; a pair of releasable hooks pivotally mounted to the support sleeve around the socket wrench with the tips of the releasable hooks extending beyond the socket wrench, the releasable hooks being movable between a first position in which the tips of the releasable hooks are in gripping engagement with the bolt and a second position in which the tips of the releasable hooks are released from the gripping engagement with the bolt; first control means for selectively moving the releasable hooks between the first and second positions; and second control means for selectively moving the outer cover axially relative to the control rod.

As in the first embodiment of the present invention, the control rod and the outer cover are comprised of a plurality of corresponding interconnectable sections, and each interconnectable section of the control rod includes a sealed cavity formed therein to create a buoyant force when in use in an underwater environment. Also, the bolt wrench includes guide means mounted stationary with respect to the support sleeve to facilitate guidance of the bolt wrench into the operative position relative to the bolt, which guide means comprises a sleeve having a rectangular cross section with a flared end and adapted to receive a bail of a nuclear fuel assembly.

In the second embodiment of the invention, the first control means comprises a pair of guide rollers mounted on the releasable hooks, and an actuator link mounted on the support sleeve for axial movement relative thereto and operatively connected to the outer cover, the actuator link having a pair of guide grooves adapted to receive the associated guide rollers, the guide grooves being configured to move the releasable hooks between the first and second positions upon reciprocal movement of the actuator link. The first control means preferably includes a safety rod operatively associated with the actuator link and the outer cover, and first spring means adapted to be compressed by the axial movement of the outer cover in a direction tending to move the releasable hooks into the first position to thereby prevent the axial movement of the actuator link in that direction when the releasable hooks are not properly gripping the bolt.

Also, the second control means comprises a cylindrical support for supporting the outer cover for axial as well as rotational movement therein and for supporting the control rod for rotational movement therein, second spring means operatively associated with the outer cover and the control rod to urge the outer cover toward the second end of the control rod, a support ring mounted on the cylindrical support, and a control lever pivotally mounted to the support ring and operatively connected to the outer cover to axially move the outer cover relative to the control rod. Preferably, the second control means includes lock means for locking the control lever in its positions corresponding to the first and second positions of the releasable hooks. The lock means comprises a trigger pivotally mounted to the control lever and having a hook, a counter hook provided on the support ring and adapted to be engaged by the hook of the trigger, a pusher rod axially movable into abutting engagement with the trigger to lock it, third spring means operatively associated with the pusher rod to urge it into abutting engagment with the trigger, a lock lever pivotally mounted to the control lever to release the pusher rod from abutting engagement with the trigger when actuated, and fourth spring means provided between the lock lever and the control lever to urge the lock lever in a direction tending to move the pusher rod into abutting engagement with the trigger.

An indicator means is also provided which provides a visual indication that the releasable hooks are properly gripping the bolt. In this embodiment, the indicator means comprises a support sleeve mounted on the outer cover for axial movement with the control rod, an indicator plate pivotally movable between a horizontal and an upright position about a pin mounted stationary with respect to the support sleeve, an actuator lever operatively associated with the indicator plate and the actuator link to move the indicator plate between the horizontal and upright positions in response to reciprocal movement of the actuator link, and fifth spring means for urging the indicator plate into the upright position. Preferably, the indicator means includes an elongated mandrel mounted within the socket wrench for axial movement therein, the mandrel being adapted to be urged axially toward the first end of the control rod due to its abutment with the bolt when the socket wrench is in turning engagement with the bolt, sixth spring means operatively associated with the mandrel to move it away from the first end of the control rod, at least one lock lever pivotally movable about a pin mounted stationary with respect to the support sleeve, a stopper pivotally mounted to the pin for movement with the at least one lock lever, seventh spring means operatively associated with the stopper to move it into a locking position to prevent the actuator link from moving the indicator plate into the horizontal position, the at least one lock lever being operatively associated with the mandrel to move the stopper away from the locking position in response to the axial movement of the mandrel toward the first end of the control rod.

BRIEF DESCRIPTION OF THE DRAWINGS

The above, as well as other features and advantages of the present invention, will become apparent through consideration of the detailed description in connection with the accompanying drawings, in which:

FIG. 2(a) is a sectional view of a fastener bolt used to secure a channel box to the fuel assembly, the fastener bolt being removed using the bolt wrench of the present invention;

FIG. 2(b) is a perspective view of the fastener bolt shown in FIG. 2(a);

FIG. 3 is a sectional view of a bolt wrench of the conventional type;

FIG. 4 is a schematic illustration of a portion of the fuel assembly, showing the manner in which the fuel assembly is placed on a fuel rack;

FIG. 6 is a cross section showing the manner in which a control lever is pivotally mounted to the cylindrical support of the bolt wrench shown in FIG. 5;

FIG. 8 is a longitudinal section of the manipulator section of the bolt wrench, showing a plurality of releasable hooks in gripping engagement with a fastener bolt and also an indicator plate in a horizontal position;

FIG. 9 is a view similar to FIG. 8, but showing the releasable hooks in an open position with the indicator plate in an upright position;

FIGS. 10(a), 10(b) and 10(c) show the control section, the shank section and the manipulator section, respectively, of a bolt wrench as constructed in accordance with a second embodiment of the present invention;

FIG. 14 is a side elevation of the manipulator section of the bolt wrench as seen from line XIV—XIV of FIG. 10(c);

DESCRIPTION OF THE PREFERRED EMBODIMENTS

Figure 5:
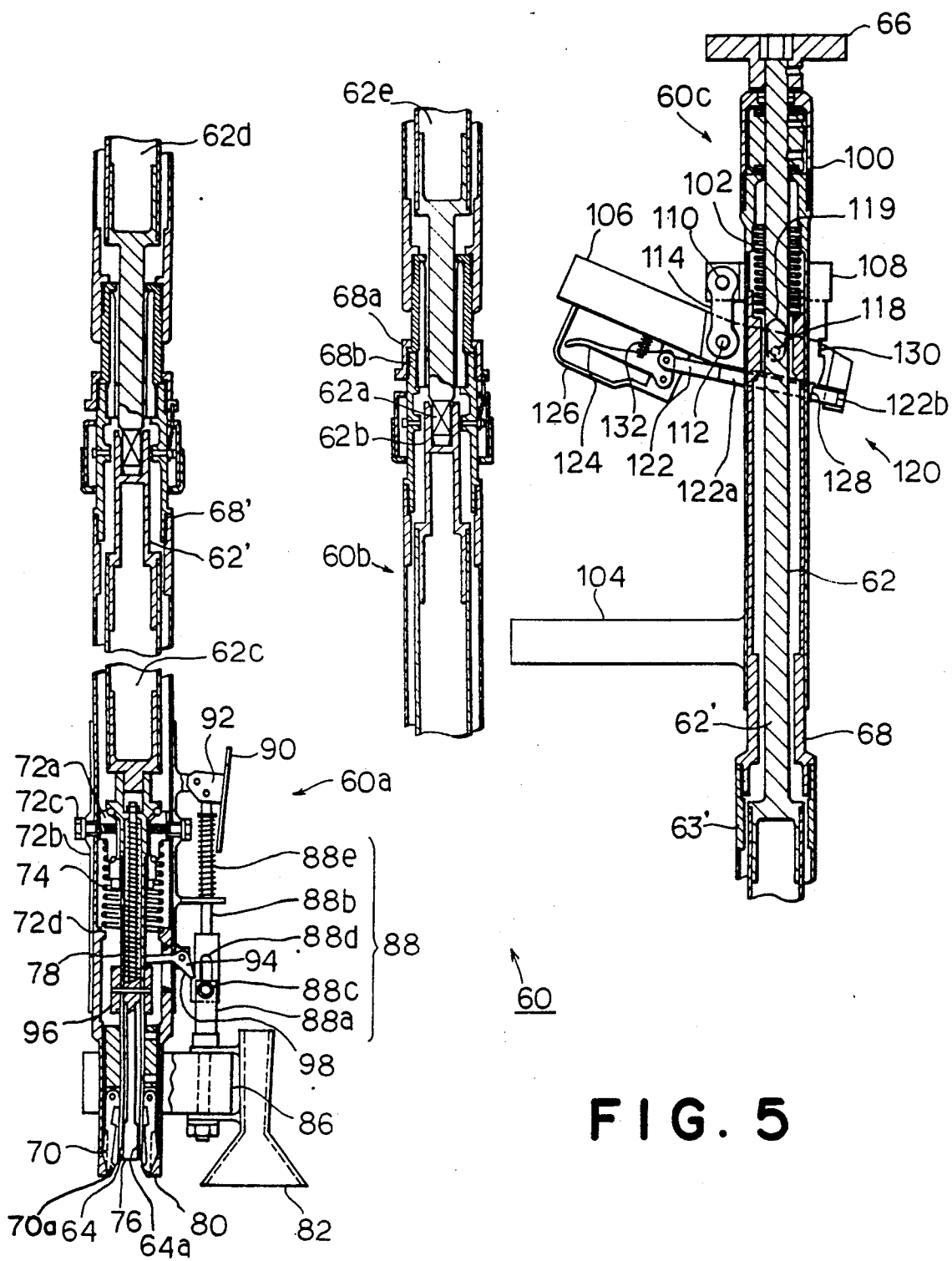
FIG. 5 is a partially broken away, longitudinal section of a bolt wrench in accordance with a first embodiment of the present invention.

Referring now to the drawings, and particularly to FIG. 5, there is illustrated a partially broken away, longitudinal section of a bolt wrench of the present invention generally designated by the numeral 60. The bolt wrench 60 is adapted especially for use in removing a fastener bolt used to secure a channel box to a nuclear fuel assembly. As shown, the bolt wrench 60 is generally composed of a manipulator section 60a, a shank section 60b and a control section 60c, these three sections being removably interconnected to provide an elongated bolt wrench which, in the illustrated embodiment, is over 10 meters long.

The bolt wrench 60 includes a control rod 62 having a cylindrical socket wrench 64 fixedly mounted to its lower open end and a control knob 66 fixedly mounted to the opposite end thereof. A cylindrical outer cover 68 is provided which supports the control rod 62 for axial as well as rotatable movement therein to a limited extent. Both the control rod 62 and the outer cover 68 are comprised of three removably interconnectable sections corresponding to the manipulator section 60a, the shank section 60b and the control section 60c of the bolt wrench 60. Each two adjacent control rod sections 62' are joined together through a tenon joint which comprises a projection 62a which is rectangular in cross-section and a complimentary recess 62b formed at adjacent ends of the rod sectons 62' to be coupled. Each two adjacent outer cover sections 68' are joined together by means of a cap nut 68a threaded on threaded portions 68b formed at mutually opposed ends of these adjacent outer cover sections 68'. Each control rod section 62' includes a sealed cavity 62c, 62d or 62e adapted to generate a buoyant force when the bolt wrench 60 is below the water level of the spent fuel storage pool to thereby facilitate handling of the bolt wrench 60.

Now the structure and operation of the manipulator section 60a of the bolt wrench 60 will be described in greater detail:

The socket wrench 64 includes a recess formed in its lower end which has a splined inner circumferential surface 64a adapted to engage the spline head 18a of the fastener bolt 16. Disposed around the socket wrench 64 are a plurality of releasable hooks 70 which are pivotally mounted on the control rod 62 with their tips 70a extending beyond the lower end of the socket wrench 64, so that these tips 70a can engage the circumferential groove 18b of the fastener bolt 16 in a gripping manner when the releasable hooks 70 are closed. Each releasable hook 70 is formed of a relatively thick metallic material and includes a spring provided in its intermediate portion to normally bias the hook 70 outwardly toward its open position.

A bearing sleeve 72a is provided which rotatably supports the control rod 62 within the outer cover 68.

On this outer cover there is provided a cylindrical support sleeve 72b which is connected to the bearing sleeve 72a by means of a plurality of bolts 72c. Between the bearing sleeve 72a and a circumferential shoulder 72d of the outer cover 68 there is provided a coil spring 74 for biasing the outer cover 68 relative to the control rod 62.

The manipulator section 60a includes an elongated mandrel 76 having its lower end disposed within the socket wrench 64 concentrically therewith and in alignment with the lower end of the control rod 62. The mandrel 76 is axially movable with respect to the socket wrench 64 and is normally biased toward the tip of the manipulator section 60a by a coil spring 78, into a position where the lower end of the mandrel 76 is flush with that of the socket wrench 64.

The outer cover 68 includes a cavity 80 formed in its open end adjacent to the socket wrench 64. The cavity 80 has an inner circumferential surface which is tapered radially inwardly toward the open end of the outer cover 68, so that as the outer cover 68 is progressively moved relative to the control rod 62 in an upward direction as viewed in FIG. 5 against the biasing action of the coil spring 74, the tapered inner circumferential surface of the cavity 80 will urge the releasable hooks 70 radially inwardly to move them into the closed position.

Figure 1:
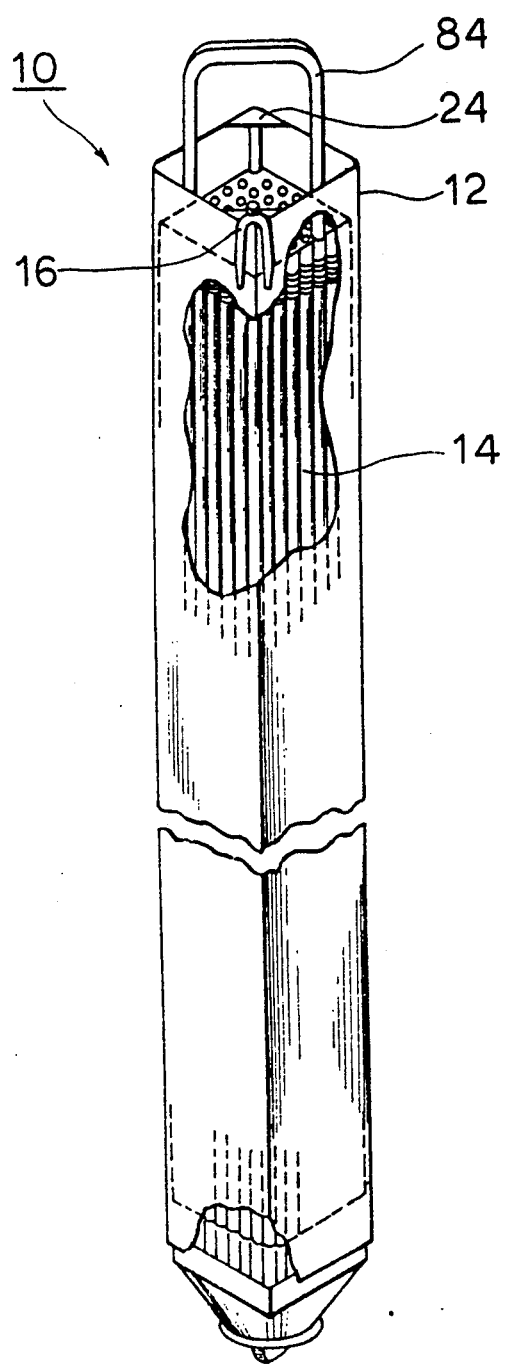
FIG. 1 is a perspective view of a nuclear fuel assembly with a channel box thereon which is partially cut away to show the fuel rods of the assembly.

The manipulator section 60a also includes a guide member 82 adapted to receive a bail 84 (see FIG. 1) of the fuel assembly 10 so as to facilitate guidance of the bolt wrench 60 into an operative position on the fastener bolt 16. In the illustrated embodiment, the guide member 82 comprises a sleeve having a rectangular cross section with a flared end and is mounted by a bracket 86 on the outer cover 68 adjacent the lower end thereof. The guide member 82 is so positioned relative to the socket wrench 64 that the socket wrench 64 comes into turning engagement with the spline head 18a of the fastener bolt 16 when the bolt wrench 60 is guided into the operative position on the fuel assembly 10 with the guide member 82 snugly receiving the bail 84 of the fuel assembly.

The manipulator section 60a also includes an indicator mechanism 88 which is adapted to provide a visual indication that the releasable hooks 70 are in gripping engagement with the spline head 18a of the fastener bolt 16. The indicator mechanism 88 comprises a colored indicator plate 90 which is pivotally mounted by a mounting bracket 92 on the cylindrical support sleeve 72b so that the indicator plate 90 can swing between a horizontal position and an upright or vertical position with the bolt wrench 60 being in a generally vertical, operative condition. The indicator mechanism 88 also includes a pair of telescopic actuator rods 88a and 88b for controlling the swinging movement of the indicator plate 90, the actuator rod 88a having one end fixedly attached to the mounting bracket 86 for the guide member 82 and the other end operatively connected to one end of the other actuator rod 88b by means of a pin 88c loosely received in a slit 88d formed in the actuator rod 88a, so that the actuator rod 88b can be moved relative to the actuator rod 88a to a predetermined extent. The other end of the actuator rod 88b is pivotally mounted to the mounting bracket 92 of the indicator plate 90. The actuator rod 88b includes a coil spring 88e provided therearound which normally biases the actuator rod 88b in a direction to move the indicator plate 90 to the horizontal position. The indicator mechanism 88 also includes a lock lever 94 provided with a hooked end and extending through mutually aligned openings formed in the cylindrical support sleeve 72b and the outer cover 68. The lock lever 94 is pivotally mounted to the cylindrical support sleeve 72b adjacent its lower end so that the other end of the lock lever 94 is held in contact with a stopper 96 provided adjacent the lower end of the outer cover 68 and also that its hooked end is normally in engagement with a shoulder 98 formed on the actuator rod 88a.

Now the structure and operation of the control section 60c of the bolt wrench 60 will be described in greater detail:

The control section 60c includes a cylindrical support 100 from which the upper end of the control rod 62 extends by a small length to be connected to the control knob 66. The upper end of the outer cover 68 is slidably received in the lower end of the cylindrical support 100, and between the upper end of the outer cover 68 and the cylindrical support 100 there is provided a coil spring 102 which cooperates with the coil spring 74 of the manipulator section 60a to bias the outer cover 68 downwardly relative to the control rod 62.

The control section 60c also includes a grip 104 secured to the cylindrical support 100 adjacent its lower end. A control lever 106 is provided for selectively moving the outer cover 68 upwardly relative to the control rod 62. The control lever 106 is pivotally mounted to a support ring 108 on the cylindrical support 100 by means of pins 110, 112 and a link 114. As best seen in FIG. 6, the control lever 106 is movably supported by a pair of frame plates 116 which are firmly held on the outer cover 68 on both sides thereof by bolts 118 which extend through a pair of openings 119 formed in diametrically opposite circumferential surfaces of the cylinderical support 100. With this arrangement, the control lever 106 may be rotated about the pin 112 in a counter-clockwise direction as viewed in FIG. 5 so as to move the outer cover 68 upwardly relative to the control rod 62 against the biasing action of the coil springs 74 and 102.

The control lever 106 also includes a locking mechanism 120 which acts to lock the control lever 106 at a desired position. The locking mechanism 120 comprises a latch member 122 movable along the control lever 106 and including an intermediate ring portion 122a through which the outer cover 68 extends, a latch 122b formed at its end, a trigger 124 pivotably connected to the base of the latch member 122 and pivotally supported by a trigger cover frame 126, a pair of notches 128, 130 formed on the support ring 108 and adapted to be selectively engaged by the latch 122b, and a spring 132 normally biasing the trigger 124 in a direction to urge the latch 122b of the latch member 122 into engagement with the notch 128 or 130.

Figure 7:
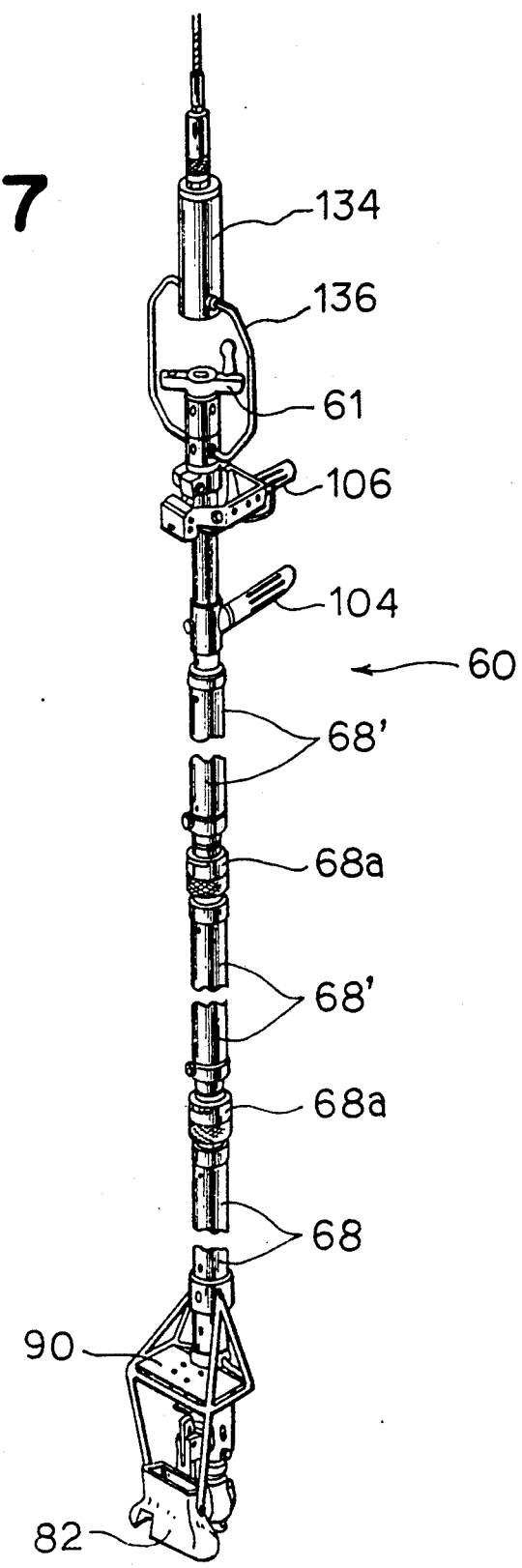
FIG. 7 is a perspective view showing the manner in which the bolt wrench of the present invention is employed.

Now the manner in which the fastener bolt 16 is removed from the fuel assembly 10 using the bolt wrench 60 of the invention will be described in detail:

(1) As shown in FIG. 7, the bolt wrench 60 is suspended by means of a spring-loaded shock absorber 134 which is connected to a suspension wire of an auxiliary crane or the like (not shown) and which is also connected to a bail 136 mounted to the upper end of the bolt wrench 60. In this condition, the bolt wrench 60 is ready for lowering toward the nuclear fuel assembly 10 in the spent fuel storage pool.

(2) The bolt wrench 60 is further lowered gradually until the guide member 82 snugly receives the bail 84 of the fuel assembly, whereupon the socket wrench 64 on the lower end of the control rod 62 reaches a position just above the head 18a of the fastener bolt 16.

(3) The bolt wrench 60 is further lowered to bring the socket wrench 64 into turning engagement with the spline head 18a of the fastener bolt 16. It should be understood that the above step (2) can be performed easily by forcing down the bolt wrench 60 against the spring action of the shock absorber 134 without further lowering the suspension wire of the crane. Since the tip of each releasable hook 70 is held within the outer cover 68, there is little likelihood that the releasable hooks 70 are damaged during lowering of the bolt wrench 60. When the socket wrench 64 comes into turning engagement with the head 18a of the fastener bolt 16, the mandrel 76 tends to be urged upward by the fastener bolt 16 against the biasing action of the spring 78, thus moving the stopper 96 upward. This will rotate the lock lever 94 in a clockwise direction as viewed in FIG. 5, disengaging it from the shoulder 98 of the actuator rod 88b.

(4) The trigger 124 of the control lever 106 is then actuated to disengage the latch 122b from the notch 128. When, in this condition, the control lever 106 is rotated in a counter-clockwise direction as viewed in FIG. 5, the outer cover 68 is moved upward relative to the control rod 62, which causes the tapered inner circumferential surface of the cavity 80 formed in the lower end of the outer cover 68 to move the tip of each releasable hook 70 radially inwardly into gripping engagement with the circumferential groove 18b of the fastener bolt 16, as best seen in FIG. 8.

Such movement of the outer cover 68 also causes upward movement of both the mounting bracket 86 and the actuator rod 88a and, since the actuator rod 88b has been already disengaged from the lock lever 94 during the previous step (3), the actuator rod 88b moves upwardly under the action of the coil spring 88e, moving the indicator plate 90 to the horizontal position which indicates that the releasable hooks 70 are in gripping engagement with the fastener bolt 16. When this occurs, the operator may release the trigger 124 to allow the latch 122b of the latch member 122 to move under the biasing action of the coil spring 132 into engagement with the other notch 130 to thereby lock the control lever 106. It should be understood that this arrangement eliminates the possibility of accidental release of the releasable hooks 70 from the closed to open position to release the fastener bolt 16.

(5) The control rod 62 may be rotated by operating the control knob 66 in a direction to cause the socket wrench 64 to loosen the fastener bolt 16 and to thereby remove it from the fuel assembly 10. Since the head 18a of the fastener bolt 16 remains gripped by the releasable hooks 70, there is little likelihood of the fastener bolt accidentally falling off from the bolt wrench 60 after having been removed from the fuel assembly 10.

(6) Finally, the lower end of the bolt wrench 60 is moved to a specific location in the spent fuel storage pool that is reserved for disposal of fastener bolts, where the releasable hooks 70 are moved to the open position to release the fastener bolt 16. In order to open the releasable hooks 70, it should be understood that the previously released trigger 124 of the control lever 106 may be actuated again to move the control lever 106 in the clockwise direction as viewed in FIG. 5 back to its initial position, so that the outer cover 68 may be moved downward relative to the control rod 62.

It should be noted that the indicator plate 90 of the indicator mechanism 88 assumes the horizontal position where it is visible to the operator, only when the socket wrench 64 comes into turning engagement with the spline head 18a of the fastener bolt 16 in step (3), followed by the releasable hooks 70 coming into gripping engagement with the bolt. If the socket wrench 64 is not in turning engagement with the fastener bolt during movement of the releasable hooks 70 into the closed position, the indicator plate 90 will remain in the vertical or upright position, as shown by FIG. 9. As will be understood, if the socket wrench 64 is not in turning engagement with the fastener bolt 16, it cannot urge the mandrel 76 upward to unlock the actuator rod 88a from the lock lever 94, and even if the actuator rod 88a is moved upwardly together with the outer cover 68, this will merely move the pin 88c along the slit 88d, so that the actuator rod 88b will not be moved upward to move the indicator plate 90 into the horizontal position.

After completion of the bolt removing operation as described above, the bolt wrench 60 can be divided into three easily portable short sections. Because of the fact that the respective joints of the three sections are common in both structure and dimensions, the manipulator section 60a may be directly joined to the control section 60c to provide a relatively short, e.g., about 6 meters long bolt wrench, and also more than one shank section 60b may be joined together into a longer bolt wrench.

It should be noted that the bolt wrench of the present invention finds utility in removing other than the fastener bolt 16 used to secure the channel box to the fuel assembly 10 and can be used to mount or remove various types of bolts which do not provide easy access by the operator.

It will be appreciated that in accordance with the preferred embodiment of the present invention, there has been provided an improved apparatus for removing a fastener bolt from a nuclear fuel assembly in an efficient and reliable manner. To recapitulate the important features of the invention:

(a) Because of its unique construction, the bolt wrench of the invention can be made long enough to handle fastener bolts on fuel assemblies which are placed sufficiently deep in a spent fuel storage pool to make the prior art bolt wrenches incapable of the intended removal operation. Accordingly, there is no need to transfer fuel assemblies from the fuel rack to a preparation machine just for purposes of fastener bolt removal. Thus, it will be unnecessary to make repeated transfers of fuel assemblies within the spent fuel storage pool, reducing the likelihood of accidental damage to the fuel assemblies during transfer. Also, less manpower will be needed to perform the bolt removal operation with the attendant advantage of reducing the operator's exposure to radioactivities.

(b) The releasable hooks of the present bolt wrench are structurally strong and durable as compared to the conventional ones, resulting in an increase in useful life.

(c) Because of its inherent structural features, the bolt wrench of the present invention can be divided into shorter sections which are easy to handle for storage or transportation. Also there is no tendency for the bolt wrench to bend due to its own weight. Accordingly, the bolt wrench of the invention is relatively trouble-free because of freedom from unwanted forces exerted thereto during inspections and transportation.

(d) Provision of the sealed cavities formed in the control rod creates a buoyant force tending to facilitate underwater operation of the bolt wrench.

(e) By using the indicator mechanism which visually indicates that the bolt wrench is in gripping engagement with the fastener bolt, the operator can effectively eliminate the possibility that unknowingly he will try to move the fastener bolt upwardly with the releasable hooks not in gripping engagement with the fastener bolt.

Referring now to FIGS. 10(a) through 10(c), there is illustrated a partially broken away, longitudinal section of a bolt wrench 260 as constructed in accordance with a second embodiment of the present invention. As with the bolt wrench 60 of FIG. 5, the bolt wrench 260 is generally composed of a manipulator section 260a, a shank section 260b and a control section 260c and these three sections are removably interconnected to provide a complete bolt wrench which is about 10 meters long.

As seen in FIG. 10(a), the control section 260c includes a cylindrical support 300 having an open lower end and an upper end which is centrally formed with an opening 300a. The control section 260c also includes a control rod 262 whose upper end extends through the opening 300a and projects from the cylindrical support 300.

The bolt wrench 260 includes an outer cover 268 having an upper portion 268a with its outer diameter slightly smaller than that of the remaining portions, so that the outer cover 268 is axially movable within the cylindrical support 300 relative thereto. A spring 302 is provided within the cylindrical support 300 to normally bias the outer cover 268 downwardly relative thereto.

As best seen in FIG. 10(c), the manipulator section 260a includes a tubular socket wrench 264 which is secured to the lower end of the control rod 262 by means of bolts 265. The control rod 262 extends through the cylindrical support 300 and the outer cover 268 concentrically therewith and are mounted therein for axial as well as rotational movement relative to both the cylindrical support 300 and the outer cover 268. Springs 274 and 275 are provided within the support sleeve 291 to normally bias the control rod 262 upwardly relative thereto. Both the outer cover 268 and the control rod 262 are comprised of three interconnectable sections corresponding to the manipulator section 260a, the shank section 260b and the control section 260c of the bolt wrench 260.

Each two adjacent sections 262' of the control rod 262 are joined together through a tenon joint which comprises a projection 262b having a rectangular cross section and a complementary recess 262c formed at adjacent ends of these control rod sections 262' to be coupled. Each two adjacent sections 268' of the outer cover 268 are joined together by means of a cap nut 268b threaded on threaded portions 268c formed in mutually opposed end portions of these adjacent outer cover sections 268'. Each control rod section 262' includes a sealed cavity 262d, 262e or 262f adapted to create a buoyant force when the bolt wrench 260 is used below the water level of the spent fuel storage pool to thereby facilitate handling of the bolt wrench 260.

Figure 11:
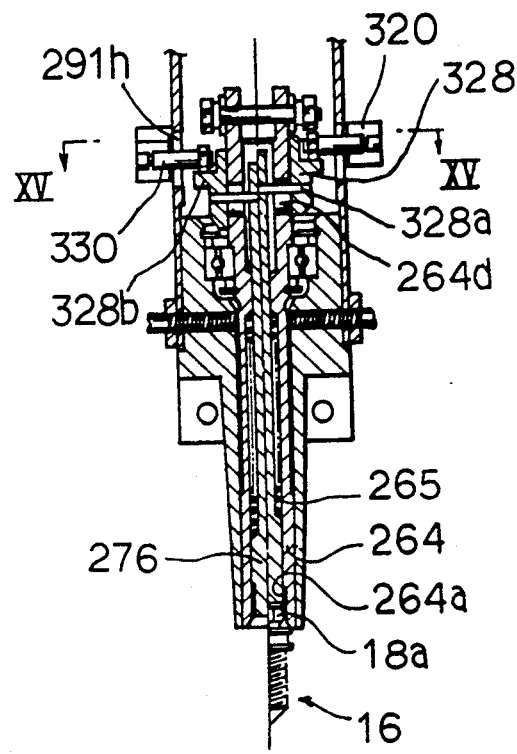
FIG. 11 is a longitudinal section taken along lines XI—XI of FIG. 10(c) showing the lower end of the manipulator section of the bolt wrench.

Now the structure and operation of the manipulator section 260a of the bolt wrench 260 will be described in greater detail with reference to FIGS. 10(c) and 11 through 15:

As best seen in FIG. 11, the socket wrench 264 includes a recess formed in its lower end which has a splined inner circumferential surface 264a adapted for turning engagement with the spline head 81a of the fastener bolt 16.

The manipulator section 260a also includes an elongated mandrel 276 having its lower end disposed within the socket wrench 264 concentrically therewith and in alignment with the lower end portion of the control rod 262. The mandrel 276 is axially movable within the socket wrench 264 and is normally biased downwardly toward the tip of the manipulator section 260a by a coil spring 265, so that the lower end of the mandrel 276 is substantially flush with that of the socket wrench 264.

Figure 13:
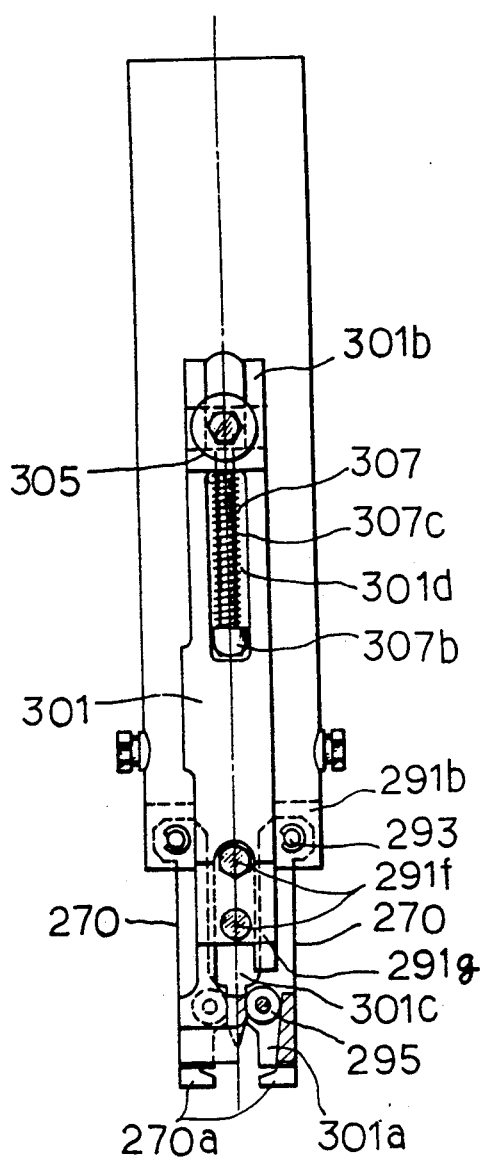
FIG. 13 is a schematic illustration of an actuator link having a pair of grooves configured to move the releasable hooks upon its reciprocal movement.
Figure 12:
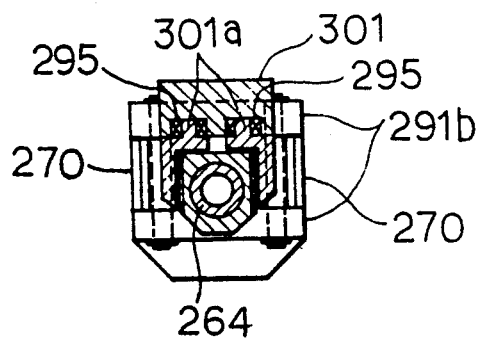
FIG. 12 is a cross section taken along line XII—XII of FIG. 12(c) showing the lower end of the manipulator section of the bolt wrench.

The manipulator section 260a also includes a support sleeve 291 which is mounted on the lower end portion of the outer cover 268 for axial as well as rotational movement relative thereto. The lower end portion 291a of the support sleeve 291 is somewhat tapered to cover the lower end portion of the socket wrench 264. As seen in FIGS. 12 and 13, the support sleeve 291 has a pair of U-shaped portions 291b integrally formed on both sides of the tapered lower end portion 291a and adapted to pivotally support a pair of releasable hooks 270 about pins 293 each extending perpendicularly to the axis of the support sleeve 291 through a pair of aligned openings formed in its associated U-shaped portion 291b. The tips 270a of the releasable hooks 270 project beyond the lower end of the socket wrench 264 so that upon closure of these releasable hooks 270, their tips 270a come into gripping engagement with the circumferential groove 18b of the fastener bolt 16. Each of the releasable hooks 270 is provided on its rear surface adjacent the tip 270a with a guide roller 295, as best seen in FIGS. 12 and 13.

The manipulator section 260c also includes a bearing sleeve 297 rotatably mounted around the control rod 262 within the outer cover 268, and an annular support member 296 threadedly secured to the lower end portion of the outer cover 268. The spring 274 is provided between the support member 296 and the bearing sleeve 297 to urge the bearing sleeve 297 against a shoulder 268t formed in the inner peripheral surface of the outer cover 268. Accordingly, the control rod 262 is normally biased upwardly, as has previously been described above.

As best seen in FIG. 13, the manipulator section 260c includes an actuator link 301 provided adjacent its lower end, which comprises a pair of guide grooves 301a for slidably receiving the guide rollers 295 in order to guide the opening and closing movement of the associated releasable hooks 270. Adjacent its lower end, the actuator link 301 has a slit 301c formed therein which is adapted for receipt of a bolt 291f connecting a guide memeber 282 to the lower end portion 291a of the support sleeve 291 by means of a holding plate 291g. This arrangement permits the actuator link 301 to move in an axial direction relative to the support sleeve 291.

As seen in FIG. 13, the actuator link 301 has a bifurcated upper end 301b and another slit 301d formed therein adjacent the bifurcated end. The bifurcated upper end 301b of the actuator link 301 is operatively connected to the support member 296 for the outer cover 268 by means of a bolt 303 (see FIG. 10(c)) to which the bifurcated end 301c is secured through a washer 305, so that the actuator link 301 is movable in an axial direction along the outer support sleeve 291. The bolt 303 extends through a pair of diametrically opposed, oblong openings 291a formed in the support sleeve 291. As best seen in FIG. 10(c), the bolt 303 is threaded into the support member 296 and further into an upper end portion 307a of a safety rod 307 that is slidably received in the bifurcated portion 301b of the actuator link 301. As best seen in FIG. 13, the safety rod 307 has a stopper 307b provided on its lower end and a spring 301c mounted therearound between the upper end of the slit 301d and the stopper 307b. Specifically, the upper end of the actuator link 301 is not directly mounted to the support member 296 for the outer cover 268 but is operatively connected to the support member 296 through the safety rod 307. Accordingly, upward movement of the outer cover 268 will cause the actuator link 301 to move upward under the biasing action of the spring 301c and thereby cause the guide rollers 110 to move along the associated guide grooves 301a in the lower end of the actuator link 301 so as to move the tips 270a of the associated releasable hooks 270 toward each other.

Let it be assumed that an operator attempts to close the releasable hooks 270 without knowing that they are not properly gripping the head 18a of the fastener bolt 16, i.e., the tips 270a of the releasable hooks 270 engage the fastener bolt 16 but at any other portion than the circumferential groove 18b. In this condition, the releasable hooks 270 cannot be moved to their fully closed position; however, it will be appreciated that no damage will be inflicted on the tips 270a of the releasable hooks 270 due to excessive forces which would otherwise be exerted on the tips if there were no such safety rod 307 as employed in this embodiment. In other words, during closure of the releasable hooks 270 as caused by the upward movement of the outer cover 268, the actuator link 301 is moved upwardly along with the safety rod 307. However, if the releasable hooks 270 are not properly gripping the safety bolt in that they cannot move into the fully closed position, the upward movement of the safety rod 307 will act to compress the spring 307c, so that there will be no corresponding upward movement of the actuator link 301.

Referring to FIG. 10(c), the manipulator section 260a includes the guide member 282 which, in the illustrated embodiment, comprises a sleeve having a rectangular cross section and a flared end which is adapted to receive a bail 84 (see FIG. 1) of the fuel assembly 10 to facilitate guidance of the bolt wrench 260 into an operative position above the fastener bolt 16. The guide member 282 is mounted by a bracket 286 on the support sleeve 291 adjacent the lower end thereof. The guide member 282 is so positioned relative to the socket wrench 264 that the socket wrench 264 is in turning engagement with the spline head 18a of the fastener bolt 16 when the guide member 282 is positioned to receive the bail 84 of the fuel assembly 10.

The manipulator section 260a also includes an indicator mechanism 288 adapted to provide a visual indication that the releasable hooks 270 have been moved to their closed position where they properly grip the head 18a of the fastener bolt 16. As best seen in FIG. 14, the indicator mechanism 288 includes a colored indicator plate 290 which is pivotally mounted to a bifurcated upper end 310a of a frame 310 by means of a support pin 290a. The frame 310, in turn, is secured to the support sleeve 291 by means of a fixture 310b. The indicator mechanism 288 includes an axially movable actuator lever 312 whose upper end is pivotally connected to the indicator plate 290. The lower bifurcated end 312a of the actuator lever 312 is operatively connected to the frame 310 by means of a bolt 314 which is slidably received in a groove formed in the bifurcated end 312a of the actuator lever 312, as seen in FIG. 10(c). The actuator lever 312 is also connected to the actuator link 301 by means of a bolt 316 extending through this actuator link. The support pin 290a carries therearound a coil spring 290b which normally biases the indicator plate 290 in a direction to move the indicator plate 290 from the vertical to horizontal position.

Referring again to FIG. 10(c), there is provided a lock mechanism 319 for preventing axial movement of the actuator link 301 when the releasable hooks 270 are not properly gripping the fastener bolt 16. The lock mechanism 319 includes a pair of lock levers 320 which are pivotally mounted to the frame 310 by means of a pin 322. The lock levers 320 are normally biased by a coil spring 324 in the counter-clockwise direction as viewed in FIG. 10(c). The pin 322 has a stopper 326 fixedly mounted thereto for pivotal movement with the lock levers 320. The stopper 326 has a hooked end adapted to engage a notch formed in the actuator link 301. Since the lock levers 320 are urged in the counter-clockwise direction as viewed in FIG. 10(c), the hooked end of the stopper 326 is normally in engagement with the notch in the actuator link 301 to prevent its axial movement.

Figure 15:
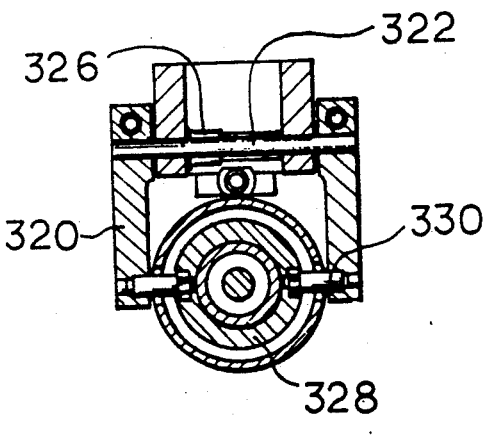
FIG. 15 is a cross section taken along lines XV—XV of FIG. 10(c) showing a pair of lock levers used to prevent reciprocal movement of the actuator link when the releasable hooks are not properly gripping the fastener bolt.

Referring to FIGS. 11 and 15, the lock mechanism 319 further includes a ring 328 which is mounted around the socket wrench 264 adjacent its upper end for sliding movement therein in an axial direction. The ring 328 is connected to the mandrel 276 by means of a pin 328a extending through a longitudinally extending opening 264d formed in the socket wrench 264. The ring 328 is formed with a flange 328b extending outwardly therefrom. The support sleeve 291 has a pair of diametrically opposite, oblong openings 291h formed therein, through which stopper pins 330 extend with their inner ends in abutting engagement with the flange 328b. The stopper pins 330 are connected at their outer ends to the free ends of the lock levers 320. In this arrangement, upward movement of the mandrel 276 against the action of the spring 265 will cause upward movement of the ring 328, which moves the stopper pins 330 upward within the limits of the oblong openings 291h to rotate the lock levers 320 about the pin 322 in the counter-clockwise direction as viewed in FIG. 10(c). When this occurs, the stopper 326 is rotated in the same counter-clockwise direction against the action of the spring 324, disengaging its hooked end from the notch formed in the actuator link 312, so that the actuator link 312 is free to move in an axial direction. Accordingly, it will be appreciated that if the releasable hooks 270 are not properly gripping the fastener bolt 16, so that the bolt cannot urge the mandrel 264 upwardly, the actuator link 312 cannot move axially because of the hooked end of the stopper 326 being in engagement with the notch in the actuator link 312.

Now the structure and operation of the control section 260c of the bolt wrench 260 will be described in greater detail with reference to FIGS. 10(a) and 16 through 18.

The cylindrical support 300 of the control section 260c support the outer cover 268 for axial as well as rotational movement therein, which sleeve, in turn, supports the control rod 262 for rotational movement therein. The control knob 266 is fixedly mounted to the upper end of the control rod 262, as described above. The control section 260c also includes a grip 204 secured to the cylindrical support 300 adjacent its lower end.

A control lever 206 is provided which moves the control cover 268 downwardly against the biasing action of the spring 302. The control lever 206 is pivotally mounted to a support ring 208 by means of a pivot 212 and a link 214, the support ring 208 being fixedly mounted around the cylindrical support 300, as best seen in FIG. 16.

Figure 16:
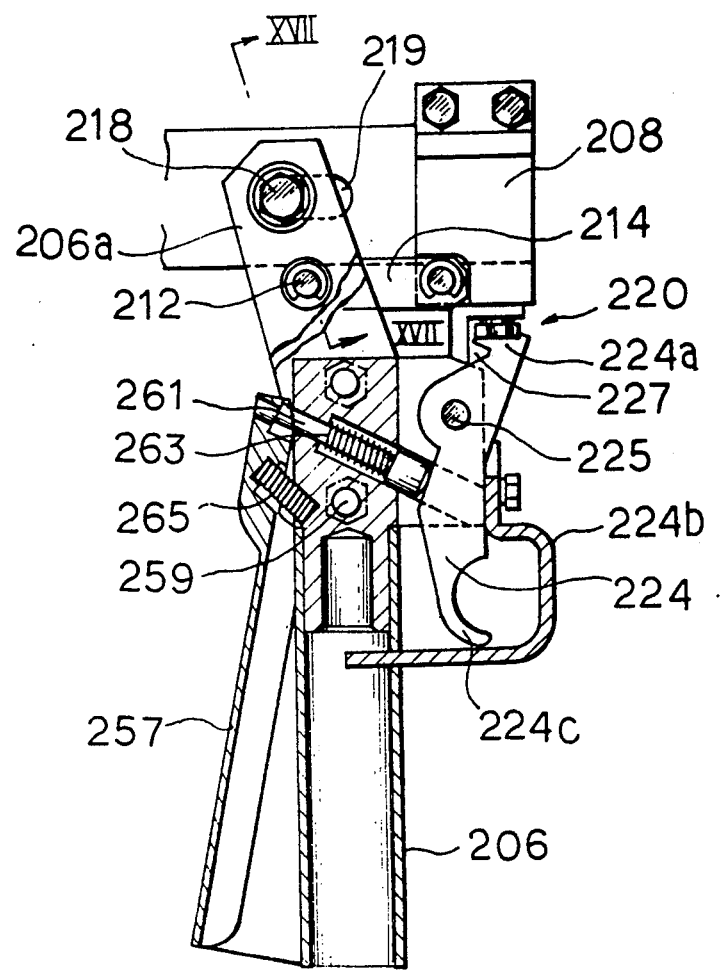
FIG. 16 is a detailed schematic illustration of a control lever of the control section shown in FIG. 10(a)
Figure 17:
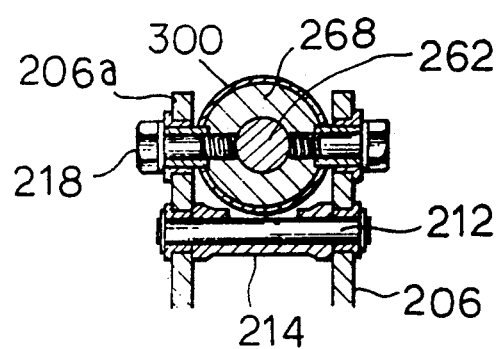
FIG. 17 is a cross section showing the manner in which the control lever is pivotally mounted to the cylindrical support of the control section.

As seen in FIGS. 16 and 17, the control lever 206 has a pair of frame portions 206a disposed on diametrically opposite sides of the cylindrical support 300, which are operatively connected to the outer cover 268 by means of a pair of bolts 218 extending through diametrically opposite, oblong openings 219 formed in the cylindrical support 300. In this arrangement, the control lever 206 may be rotated about the pin 212 in the counter-clockwise direction as viewed in FIG. 10(a) to move the outer cover 268 upwardly relative to the cylindrical support 300 and the control rod 262 against the biasing action of the spring 302.

Referring again to FIG. 16, the control section 260c includes a locking mechanism 220 for locking the control lever 206 at a desired position after it has moved the outer cover 268 upward to move the releasable hooks 270 to the closed position. The locking mechanism 220 comprises a trigger 224 pivotally mounted to the control lever 206 by means of a pin 225, the foremost end of the trigger 224 being formed with a hook 224a. A counter hook 227 is secured to the support ring 208 by a bolt 229 so as to be engaged by the hook 224a of the trigger 224 when the control lever 206 is rotated in the counter-clockwise direction as viewed in FIG. 10(a) to the position as shown in FIG. 16. As seen in FIG. 16, the control lever 206 has a lock lever 257 pivotally mounted thereto by means of a pin 259 in order to move the trigger 224 to the locked position as shown in FIG. 16, in which the hook 224a thereof is in engagement with the counter hook 227. A pusher rod 261 extends through the control lever 206 between the lock lever 257 and the trigger 224 and the lock lever 257 is normally biased by a spring 263 to move the pusher rod 261 to an axial position to lock the trigger 224 through engagement of its hook 224a and the counter hook 227. A trigger cover 224b is secured to the control lever 206 to protect the actuating end 224c of the trigger 224. Another spring 265 is provided between the lock lever 257 and the control lever 206 to normaly urge the lock lever 257 in the counter-clockwise direction as viewed in FIG. 16.

Figure 18:
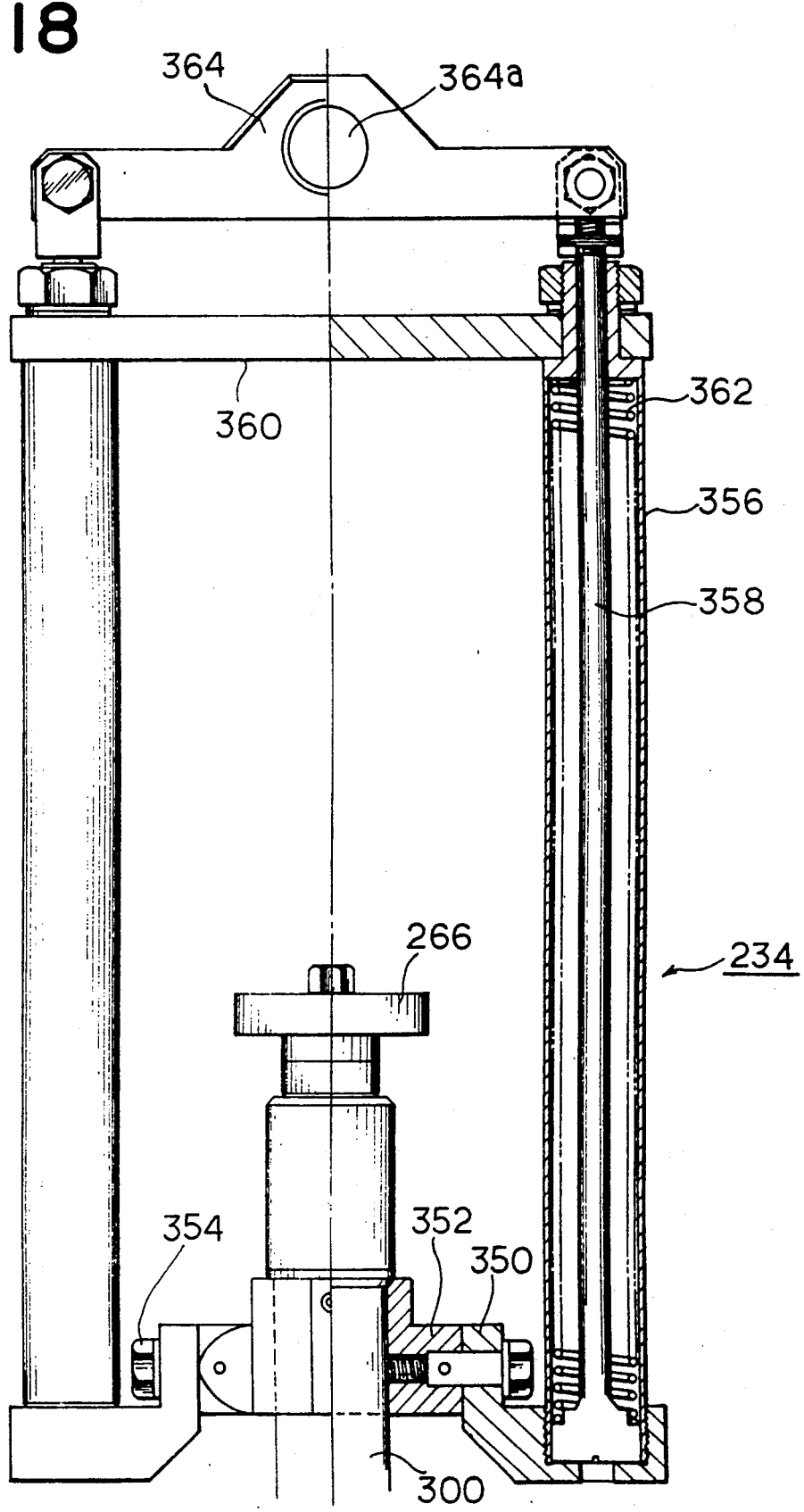
FIG. 18 is a schematic illustration of a shock absorber used to suspend the bolt wrench of the present invention from a crane.
Figure 19:
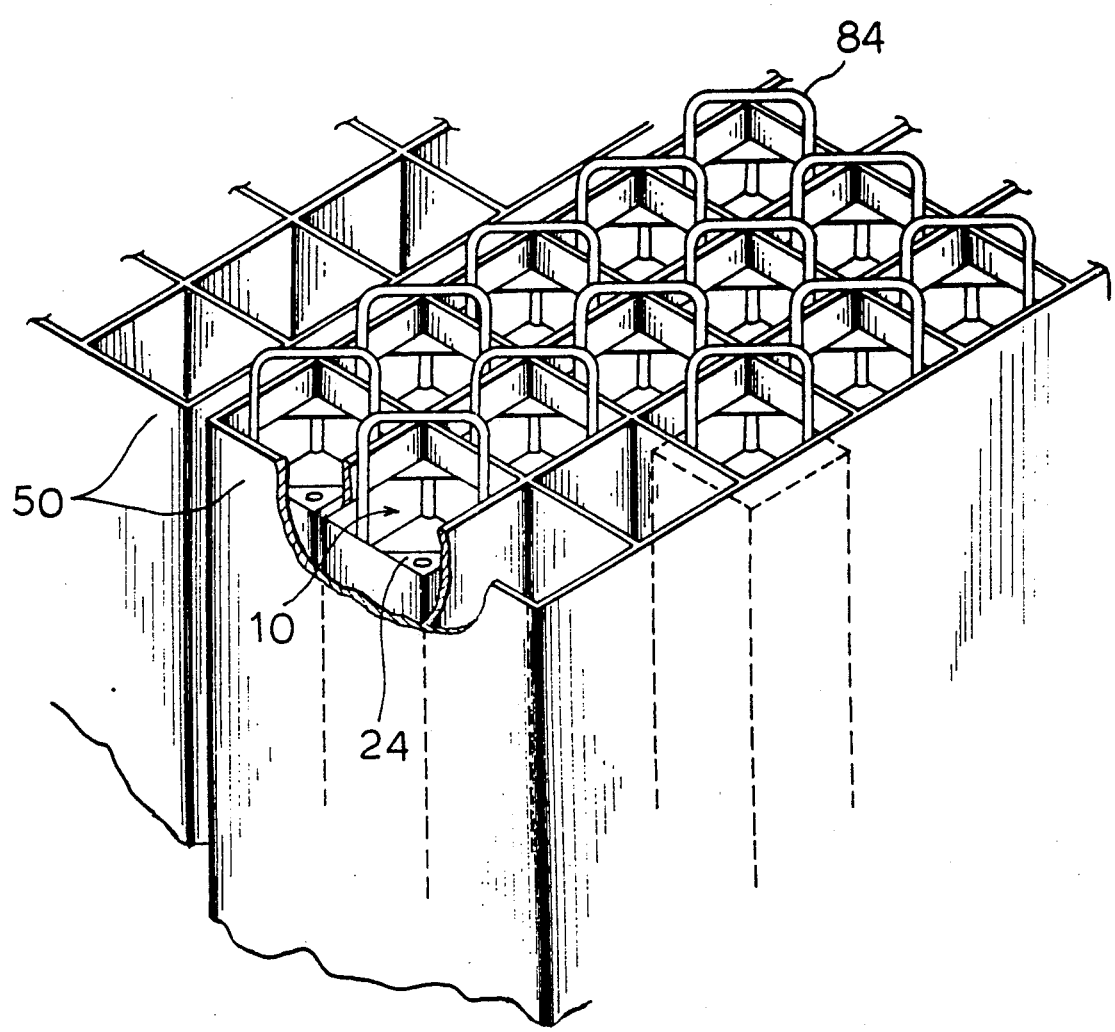
FIG. 19 is a perspective view of a fuel rack having a plurality of fuel assemblies stored thereon.

Referring to FIG. 18, there is provided a shock absorber 234 adapted for resilient suspension of the bolt wrench 260. This shock absorber 234 includes a pair of support members 350 fixedly mounted to a ring 352 by a pair of bolts 354, the ring 352 being rotatably mounted to the upper end of the cylindrical support 300. The shock absorber 234 also includes a pair of support pipes 356 each having its lower end threaded into its associated support member 350, a pair of suspension rods 358 each threaded into an upper support plate 360 and extending through its associated support pipe 356 concentrially therewith with its upper end extending beyond the upper end of the supporting pipe 356, and a pair of springs 362 each provided around its associated suspension rod 358 within its associated support pipe 356. Between the upper ends of the suspension rods 358 there is provided a suspension member 364 having an opening 364a which is adapted for suspension by a lifting means such as a crane.

Referring to FIG. 10(b), the shank section 260b of the bolt wrench 260 includes the control rod 262 which is supported by a bearing sleeve 366 concentrically within the outer cover 268 for axial as well as rotational movement therein. A spring 368 is provided within the outer cover 268 to normally urge the control rod 262 upwardly relative to the outer cover 268.

Now the manner in which the fastener bolt 16 is removed from the fuel assembly 10 using the bolt wrench 260 of the invention will be described in greater detail:

(1) The bolt wrench 260 is suspended from a crane or the like (not shown) by means of a spring-loaded shock absorber 234 which is connected to a suspension wire (not shown) of the crane. In this condition, the bolt wrench 260 is lowered gradualy toward the nuclear fuel assembly placed on a fuel rack (see FIG. 11) in a spent fuel storage pool.

(2) In further lowering the bolt wrench 260, the guide member 282 is used as a reference to guide the bolt wrench into the operative position until the guide member snugly receives the bail 84 of the fuel assembly 10, whereupon the socket wrench 264 on the lower end of the control rod 262 has reached a position just above the head 18a of the fastener bolt 16.

(3) The bolt wrench 260 is further lowered to bring the socket wrench 264 into turning engagement with the spline head 18a of the fastener bolt 16. It should be noted that the above step (2) can be performed easily by forcing down the bolt wrench 260 against the spring action of the shock absorber 234 without further lowering the suspension wire of the crane. Once the socket wrench 264 has come into turning engagement with the spline head 18a of the fastener bolt 16, the mandrel 276 tends to be urged upward by the head 18a of the fastener bolt 16 against the biasing action of the spring 265 thus causing the ring 328 to move upward. This upward movement of the ring 328 will cause the lock levers 320 to rotate in the clockwise direction as viewed in FIG. 10(c), disengaging the stopper 322 from the notch in the actuator link 312 so that the actuator link 312 is now free to move in an axial direction.

(4) Then, the control lever 206 may be rotated about the pin 212 in the counter-clockwise direction as viewed in FIG. 10(a) to bring the hook 224a of the trigger 224 into engagement with the counter hook 227, which results in upward movement of the outer cover 268 relative to the cylindrical support 300 under the biasing action of the spring 302. Simultaneously therewith, the safety rod 307 moves upward and also the actuator link 301 moves upward with respect to the cylindrical sleeve 291 under the biasing action of the spring 307c. During this movement of the actuator link 301, the guide rollers 295 are in rolling engagement with the associated guide grooves 301a formed in the lower end portion of the actuator link 301, so that the releasable hooks 270 are moved into the closed position where their tips 270a engage the circumferential groove 141b of the fastener bolt 16 in a manner to grip the bolt 16. This movement of the actuator link 301 will also cause the actuator lever 312 to move upward, rotating the indicator plate 290 to the horizontal position against the biasing action of the coil spring 290b, to indicate that the releasable hooks 270 are properly gripping the fastener bolt 16. Since the hook 224a is in engagement with the counter hook 227, the control lever 206 is locked against free movement. The spring 263 urges the pusher rod 261 to hold the trigger 224 in the locked position, which effectively prevents accidental release of the releasable hooks 270 from the fastener bolt 16 during transfer thereof.

(5) The control rod 262 may be rotated by operating the control knob 266 in order to rotate the socket wrench 264 in a direction to loosen the fastener bolt 16 for removal thereof from the fuel assembly 10. Since the head 18a of the fastener bolt 16 is gripped by the releasable hooks 270, there is little likelihood of the fastener bolt 16 accidentally falling off from the bolt wrench 260 after having been removed from the fuel assembly 10.

(6) Finally, the lower end of the bolt wrench 260 may be moved to a specific location in the spent fuel storage pool that is reserved for disposal of fastener bolts. The releasable hooks 270 are then moved to the open position to release the fastener bolts C. In order to open the releasable hooks 270, the lock lever 257 may be rotated in the counter-clockwise direction as viewed in FIG. 16 against the biasing action of the spring 265 to enable or unlock the trigger 224. Actuation of the trigger 224 will result in disengagement of the hook 224a from the counter hook 227. Accordingly, the outer cover 268 is moved downward relative to the cylindrical support 300 and the support sleeve 291 under the biasing action of the springs 302, 274 and 275. Simultaneously therewith, the control lever 206 is rotated in the clockwise direction as viewed in FIG. 10(a), contrary to the above step (4), moving the actuator link 301 downward, so that the releasable hooks 270 are moved to the open position because of the rolling engagement of their guide rollers 295 with the associated guide grooves 301a formed in the actuator link 301. When this occurs, the indicator plate 290 is rotated to its vertical position where the indicator plate 906 is invisible to the operator.

After completion of the bolt removing operation as described above, the bolt wrench 260 can be divided into three easily portable short sections. Because of the fact that the respective joints of the three sections are common in both structure and dimensions, the manipulator section 260a may be directly joined to the control section 260c to provide a relatively short, e.g., about 6 meters long bolt wrench, and also more than one shank section 260b may be joined together into a longer bolt wrench.

It should be noted that the bolt wrench of the present invention finds utility in removing other than the fastener bolt 16 used to secure the channel box to the fuel assembly 10 and can be used to mount or remove various types of bolts which do not provide easy access to the operator.

It will be appreciated that in accordance with this embodiment of the present invention there has been provided an improved apparatus for removing a fastener bolt from a nuclear fuel assembly in an efficient and reliable manner. To recapitulate the important features of the invention:

(a) Because of its unique construction which permits dimensioning of the lower end of the socket wrench for engaging the bolt head as small as possible while arranging the releasable hooks in a position free from any interference from the fuel rack, the bolt wrench of the present invention facilitates mounting and removal of a fastener bolt from the fuel assembly stored on the fuel rack, irrespective of whether the fuel assembly is of such construction that the upper end of the channel box projects above or recedes from the upper end of the fuel rack frame.

(b) Movement of the releasable hooks to their open or closed position is caused by reciprocal movement of the actuator link having a pair of guide grooves which are in rolling engagement with their associated guide rollers mounted on the releasable hooks. This construction is not spring based thus providing an increased durability and a longer useful life for the bolt wrench of the present invention.

(c) Because of its inherent structural features, the bolt wrench of the present invention can be divided into shorter sections which are easy to handle for storage or transportation. Also, there is no tendency for the bolt wrench to bend due to its own weight. Accordingly, the bolt wrench of the present invention is relatively trouble-free because of freedom from unwanted forces exerted thereto during inspections and transportation.

(d) With the provision of the indicator mechanism which provides a visual indication that the bolt wrench is firmly gripping the fastener bolt, the operator can effectively eliminate the possibility that unknowingly he will try to move the fastener bolt upwardly with the releasable hooks not properly gripping the fastener bolt.

(e) The spring-loaded shock absorber allows the bolt wrench to be moved vertically within a predetermined range without affecting the operating length of the suspension wire, thus facilitating the fastener bolt removing operation.

(f) The specific construction that the actuator link is operatively connected to the outer cover by way of the safety rod results in increased protection for the releasable hooks against damage because, if the operator tries to move the releasable hooks to the closed position without realizing that the releasable hooks are not in proper gripping engagement with the head of the fastener bolt, they will not be moved to the completely closed position thus preventing excessive forces from being exerted to the tips of the releasable hooks.

What is claimed is:

1. A bolt wrench comprising, in combination:
   a control rod having a knob mounted to its first end and a socket wrench mounted to its second end, the socket wrench having a splined inner circumferential surface adapted to come into turning engagement with the head of a bolt to be removed when the bolt wrench is brought into an operative position relative to the bolt;
   an outer cover for supporting the control rod for axial as well as rotational movement therein;
   a plurality of releasable hooks pivotally mounted to the second end of the control rod around the socket wrench with the tips of the releasable hooks extending beyond the socket wrench, the releasable hooks being movable between a first position in which the tips of the releasable hooks are in gripping engagement with the bolt and a second position in which the tips of the releasable hooks are released from the gripping engagement with the bolt;
   first control means for selectively moving the releasable hooks between the first and second positions; and
   second control means for selectively moving the outer cover axially relative to the control rod.

2. A bolt wrench as defined in claim 1, wherein the control rod and the outer cover are comprised of a plurality of corresponding interconnectable sections.

3. A bolt wrench as defined in claim 2, wherein each interconnectable section of the control rod includes a sealed cavity formed therein to create a buoyant force when in use in an underwater environment.

4. A bolt wrench as defined in claim 1, further comprising guide means mounted to the outer cover to facilitate guidance of the bolt wrench into the operative position relative to the bolt.

5. A bolt wrench as defined in claim 4, wherein the guide means comprises a sleeve having a rectangular cross section with a flared end and adapted to receive a bail of a nuclear fuel assembly.

6. A bolt wrench as defined in claim 1, wherein the first control means comprises first spring means operatively associated with the releasable hooks to urge their tips radially outwardly toward their second position, and an inner circumferential surface formed in the end of the outer cover adjacent to the releasable hooks, the inner circumferential surface of the outer cover being tapered radially inwardly toward the outer cover end, whereby axial movement of the outer cover away from the second end of the control rod causes the tapered inner circumferential surface to urge the releasable hooks radially inwardly into the first position.

7. A bolt wrench as defined in claim 1, wherein the second control means comprises a cylindrical support for supporting the outer cover for axial as well as rotational movement therein and for supporting the control rod for rotational movement therein, second spring means operatively associated with the outer cover and the control rod to urge the outer cover toward the second end of the control rod, a support ring mounted on the cylindrical support, and a control lever pivotally mounted to the support ring and operatively connected to the outer cover to axially move the outer cover relative to the control rod.

8. A bolt wrench as defined in claim 7, further comprising lock means for locking the control lever in its positions corresponding to the first and second positions of the releasable hooks.

9. A bolt wrench as defined in claim 8, wherein the lock means comprises a trigger pivotally mounted to the control lever, a latch member pivotally connected to the trigger, a pair of notches formed in the support ring and adapted to be selectively engaged by the latch member, and third spring means provided between the control lever and the trigger to urge the latter so that the latch member is held in engagement with a selected one of the notches.

10. A bolt wrench as defined in claim 1, further comprising indicator means for providing a visual indication that the releasable hooks are properly gripping the bolt.

11. A bolt wrench as defined in claim 10, wherein the indicator means comprises a support sleeve mounted on the outer cover for axial movement with the control rod, an indicator plate mounted to the support sleeve for swinging movement between a horizontal and an upright position, rod means operatively connecting the indicator plate and the outer cover to move the former into the horizontal position when the releasable hooks move into the first position due to the axial movement of the outer cover away from the second end of the control rod, and fourth spring means for urging the indicator plate into the upright position.

12. A bolt wrench as defined in claim 11, further comprising an elongated mandrel mounted within the socket wrench for axial movement therein, the mandrel being adapted to be urged axially toward the first end of the control rod due to its abutment with the bolt when the socket wrench is in turning engagement with the bolt, and a lock lever pivotally mounted to the support sleeve, the lock lever being operatively associated with the mandrel and the rod means to prevent axial movement of the first rod means in a direction to swing the indicator plate into the horizontal position when the socket wrench is not in turning engagement with the bolt.

13. A bolt wrench as defined in claim 12, wherein the rod means comprises a first and a second telescopic actuator rod, one end of the first actuator rod being operatively connected to the indicator plate and the opposite end of the second actuator rod being operatively connected to the outer cover, the lock lever being adapted to engage the first actuator rod to prevent its axial movement when the socket wrench is not in turning engagement with the bolt, the first and the second actuator rods being adapted to move relative to each other when the lock lever engages the first actuator rod to prevent its axial movement.

14. A bolt wrench comprising, in combination:
a control rod having a knob mounted to its first end and a socket wrench mounted to its second end, the socket wrench having a splined inner circumferential surface adapted to come into turning engagement with the head of a bolt to be removed when the bolt wrench is brought into an operative position relative to the bolt; an outer cover for supporting the control rod for axial as well as rotational movement therein;
a support sleeve mounted on the outer cover for axial movement relative to thereto, the support sleeve being disposed adjacent to the second end of the control rod;
a pair of releasable hooks pivotally mounted to the support sleeve around the socket wrench with the tips of the releasable hooks extending beyond the socket wrench, the releasable hooks being movable between a first position in which the tips of the releasable hooks are in gripping engagement with the bolt and a second position in which the tips of the releasable hooks are released from the gripping engagement with the bolt;
first control means for selectively moving the releasable hooks between the first and second positions; and
second control means for selectively moving the outer cover axially relative to the control rod.

15. A bolt wrench as defined in claim 14, wherein the control rod and the outer cover are comprised of a plurality of corresponding interconnectable sections.

16. A bolt wrench as defined in claim 15, wherein each interconnectable section of the control rod includes a sealed cavity formed therein to create a buoyant force when in use in an underwater enviroment.

17. A bolt wrench as defined in claim 14, further comprising guide means mounted stationary with respect to the support sleeve to facilitate guidance of the bolt wrench into the operative position relative to the bolt.

18. A bolt wrench as defined in claim 17, wherein the guide means comprises a sleeve having a rectangular cross section with a flared end and adapted to receive a bail of a nuclear fuel assembly.

19. A bolt wrench as defined in claim 14, wherein the first control means comprises a pair of guide rollers mounted on the releasable hooks, and an actuator link mounted on the support sleeve for axial movement relative thereto and operatively connected to the outer cover, the actuator link having a pair of guide grooves adapted to receive the associated guide rollers, the guide grooves being configured to move the releasable hooks between the first and second positions upon reciprocal movement of the actuator link.

20. A bolt wrench as defined in claim 19, wherein the first control means further includes a safety rod operatively associated with the actuator link and the outer cover, and first spring means adapted to be compressed by the axial movement of the outer cover in a direction tending to move the releasable hooks into the first position to thereby prevent the axial movement of the actuator link in that direction when the releasable hooks are not properly gripping the bolt.

21. A bolt wrench as defined in claim 14, wherein the second control means comprises a cylindrical support for supporting the outer cover for axial as well as rotational movement therein and for supporting the control rod for rotational movement therein, second spring means operatively associated with the outer cover and the control rod to urge the outer cover toward the second end of the control rod, a support ring mounted on the cylindrical support, and a control lever pivotally mounted to the support ring and operatively connected to the outer cover to axially move the outer cover relative to the control rod.

22. A bolt wrench as defined in claim 21, further comprising lock means for locking the control lever in its positions corresponding to the first and second positions of the releasable hooks.

23. A bolt wrench as defined in claim 22, wherein the lock means comprises a trigger pivotally mounted to the control lever and having a hook, a counter hook provided on the support ring and adapted to be engaged by the hook of the trigger, a pusher rod axially movable into abutting engagement with the trigger to lock it, third spring means operatively associated with the pusher rod to urge it into abutting engagment with the trigger, a lock lever pivotally mounted to the control lever to release the pusher rod from abutting engagement with the trigger when actuated, and fourth spring means provided between the lock lever and the control lever to urge the lock lever in a direction tending to move the pusher rod into abutting engagement with the trigger.

24. A bolt wrench as defined in claim 19, further comprising indicator means for providing a visual indication that the releasable hooks are properly gripping the bolt.

25. A bolt wrench as defined in claim 24, wherein the indicator means comprises a support sleeve mounted on the outer cover for axial movement with the control rod, an indicator plate pivotally movable between a horizontal and an upright position about a pin mounted stationary with respect to the support sleeve, an actuator lever operatively associated with the indicator plate and the actuator link to move the indicator plate between the horizontal and upright positions in response to reciprocal movement of the actuator link, and fifth spring means for urging the indicator plate into the upright position.

26. A bolt wrench as defined in claim 25, further comprising an elongated mandrel mounted within the socket wrench for axial movement therein, the mandrel being adapted to be urged axially toward the first end of the control rod due to its abutment with the bolt when the socket wrench is in turning engagement with the bolt, sixth spring means operatively associated with the mandrel to move it away from the first end of the control rod, at least one lock lever pivotally movable about a pin mounted stationary with respect to the support sleeve, a stopper pivotally mounted to the pin for movement with the at least one lock lever, seventh spring means operatively associated with the stopper to move it into a locking position to prevent the actuator link from moving the indicator plate into the horizontal position, the at least one lock lever being operatively associated with the mandrel to move the stopper away from the locking position in response to the axial movement of the mandrel toward the first end of the control rod.

* * * * *